United States Patent
Springer

(10) Patent No.: US 12,069,109 B2
(45) Date of Patent: Aug. 20, 2024

(54) VIRTUAL BACKGROUND RENDERING BASED ON TARGET PARTICIPANT VIEW

(71) Applicant: Zoom Video Communications, Inc., San Jose, CA (US)

(72) Inventor: Shane Paul Springer, Manchester, MI (US)

(73) Assignee: Zoom Video Communications, Inc., San Jose, CA (US)

( * ) Notice: Subject to any disclaimer, the term of this patent is extended or adjusted under 35 U.S.C. 154(b) by 174 days.

(21) Appl. No.: 17/731,599

(22) Filed: Apr. 28, 2022

(65) Prior Publication Data

US 2023/0353612 A1    Nov. 2, 2023

(51) Int. Cl.
| | |
|---|---|
| *H04L 65/403* | (2022.01) |
| *G06T 7/11* | (2017.01) |
| *G06T 11/00* | (2006.01) |
| *H04N 5/272* | (2006.01) |

(52) U.S. Cl.
CPC .............. *H04L 65/403* (2013.01); *G06T 7/11* (2017.01); *G06T 11/00* (2013.01); *H04N 5/272* (2013.01); *G06T 2207/20021* (2013.01)

(58) Field of Classification Search
CPC ......... H04L 65/403; G06T 7/11; G06T 11/00; G06T 2207/20021; H04N 5/272
USPC ....................................................... 348/14.08
See application file for complete search history.

(56) References Cited

U.S. PATENT DOCUMENTS

| | | | |
|---|---|---|---|
| 6,853,398 B2 * | 2/2005 | Malzbender | A63F 13/30 |
| | | | 348/14.09 |
| 8,081,821 B1 * | 12/2011 | Schaem | H04N 9/75 |
| | | | 382/173 |
| 9,269,157 B2 | 2/2016 | Saban et al. | |
| 9,460,117 B2 | 10/2016 | Jin | |
| 9,503,685 B2 | 11/2016 | Baron, Jr. et al. | |
| 11,082,661 B1 | 8/2021 | Pollefeys | |
| 11,146,520 B2 | 10/2021 | Lieb et al. | |
| 2008/0030621 A1 | 2/2008 | Ciudad et al. | |
| 2018/0276250 A1 | 9/2018 | Badoiu | |
| 2021/0392175 A1 | 12/2021 | Gronau et al. | |

OTHER PUBLICATIONS

View or Download Google Images, Chrome Web Store, https://chrome.google.com/webstore/detail/view-or-download-google-i/imdimpnalpmoohckmjdamjmfklhddcbg?hl=en., Mar. 3, 2020, 6 pages.

(Continued)

*Primary Examiner* — Yosef K Laekemariam
(74) *Attorney, Agent, or Firm* — Young Basile Hanlon & MacFarlane, P.C.

(57) ABSTRACT

A local background replacement image (LBGRI) is received at a first device of a first conference participant. The first device is connected to an audio-visual conference that includes conference participants. The conference participants include the first conference participant and a second participant. A source output image that includes a source foreground segment representative of the second participant is received from a second device of the second participant. The LBGRI is combined with the source foreground segment to generate a target output image. The target output image is output at the first device.

20 Claims, 13 Drawing Sheets

(56) References Cited

OTHER PUBLICATIONS

Add A Virtual Background For Remote Guests, Livestream Help Center, VIMEO, https://help.livestream.com/hc/en-us/articles/360049429031-Add-a-Virtual-Background-for-Remote-Guests, Apr. 2022, 2 pages.

How To Run Your Brand's AR Filger Campaign, https://www.accessar.co/blog/how-to-run-an-instagram-ar-filter-campaign#:~:text=When you open the filter, unique link and share it!, May 4, 2021, 10 pages.

Create Artistic Effect by Stylizing Image Background—Part 1: Project Intro, Segmentation and Style Transfer, https://medium.com/google-developer-experts/image-backround-stylizer-part-1-project-intro-d68c4547e7e3, Margaret MAYNARD_REID, Nov. 24, 2020, 6 pages.

How-To Geek, How to Change Windows 10's Wallpaper Based on Time of Day, https://www.howtogeek.com/355912/how-to-change-windows-10s-wallpaper-based on-time-of-day/, Chris Hoffman, Jun. 15, 2018, 19 pages.

Microsoft Windows Apps, Desktop Live Wallpapers. https://apps.microsoft.com/store/detail/desktop-live-wallpapers/9NZ370XBFQMG?hl=en-us&gl=US, May 31, 2022, 3 pages.

Gadget Hacks, Change Your Wallpaper Automatically by Time, Day, Location & More, https://android.gadgethacks.com/how-to/change-your-wallpaper-automatically-by-time-day-location-more-0172629, Dallas Thomas, Oct. 14, 2016, 8 pages.

Warmly: Professional Networking in Zoom, Look professional on Zoom, https://www.warmly.ai, May 31, 2022, 8 pages.

Youtube, Get a Contextually-Aware Wallpaper for Android [How-To], https://www.youtube.com/watch?v=KpdelkltyoA&T=78s, Gadget Hacks, Aug. 5, 2016, 3 pages.

* cited by examiner

VIRTUAL BACKGROUND RENDERING BASED ON TARGET PARTICIPANT VIEW

FIELD

This disclosure relates generally to communication management and, more specifically, to rendering virtual backgrounds for conference participants based on a view of a target participant.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
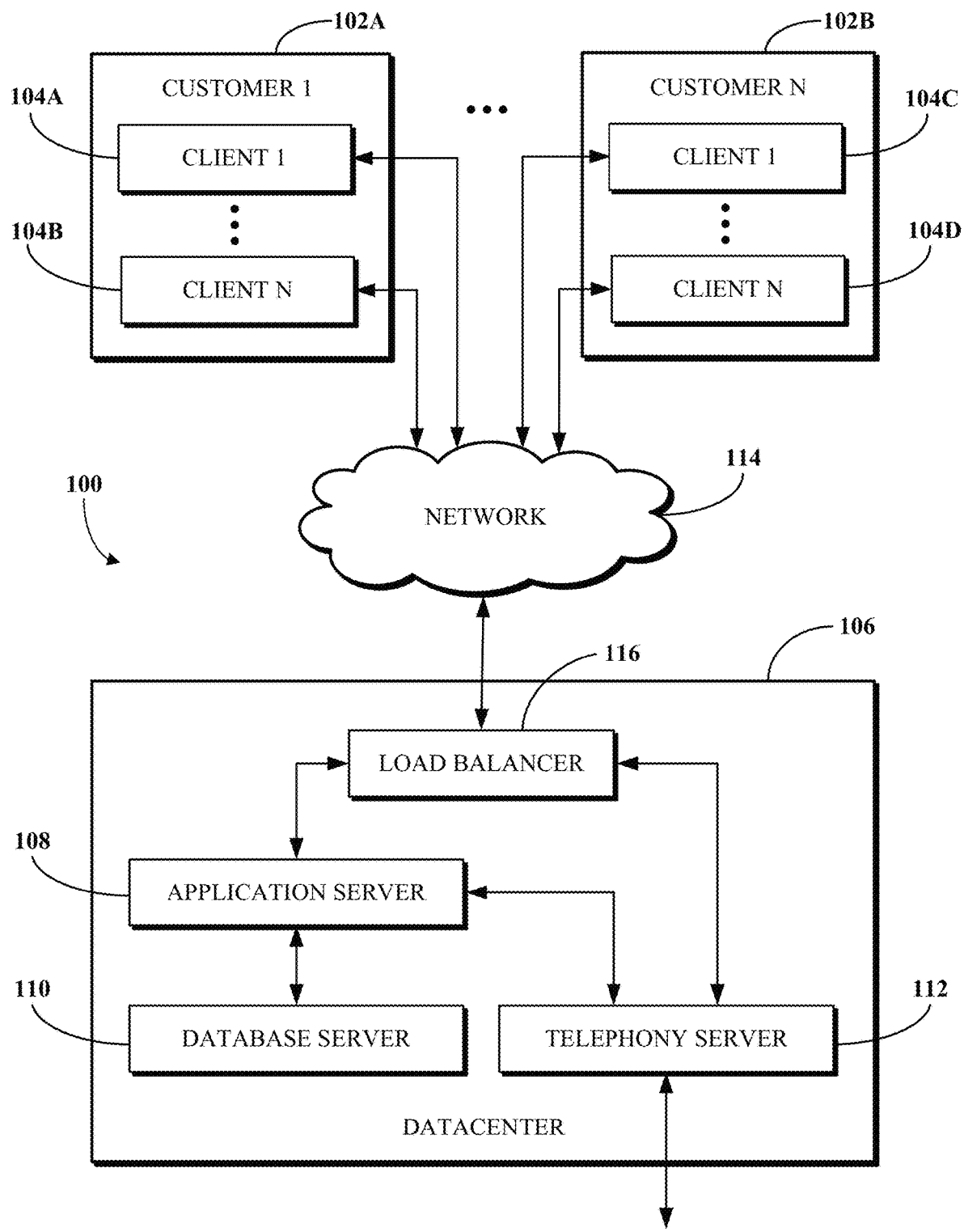
FIG. 1 is a block diagram of an example of an electronic computing and communications system.

A conferencing software, which may be standalone software or part of a software platform such as a unified communications as a service (UCaaS) platform, may allow conference participants to participate in audio-visual conferences. To visually participate in a conference, a user may enable use of their camera (e.g., a front-facing webcam) with the conferencing software. The conferencing software may obtain a video feed of the participant for transmission to other participants of the conference.

A conference participant may use a background replacement media item in place of the actual background of conference participant. A background replacement media item may also be referred to as a virtual background (VBG). The conference participant may select a VBG within a client-side conferencing software (e.g., a conferencing software) that is included in an application executable on a device of the user. A VBG is media data used to mask (e.g., overlay, overwrite, or replace) portions of one or more images of a video feed of the conference participant. The portion of an image that is masked by the VBG is referred to herein as a background segment of the image. The VBG may be a single image or may include multiple images. For example, the VBG may be an image file, a video file, an animation file (such as a Graphics Interchange Format (GIF) file), or a streaming video.

The conferencing software or a component (e.g., tool, software, application) associated therewith may process images (e.g., video frames) of an image stream (e.g., a video feed) of the user to replace the actual background captured by the camera with a corresponding (e.g., co-located and co-extensive) portion from the VBG. An image that is captured by the camera of the conference participant is referred to herein as a "camera image;" and the image of the conference participant that is transmitted to the other participants for display is referred to herein as an "output image."

A camera image typically includes a likeness (e.g., an image) of the conference participant and other image data. A segmentation software may segment a camera image into a foreground segment that includes at least a substantial portion of the likeness of the user, and a background segment that includes at least a substantial portion of the remainder of the camera image. To illustrate, if the user is sitting in front of the camera, the foreground segment may include the portion of the user within a field of view of the camera (e.g., their head and torso) and potentially one or more objects (e.g., a desk, a keyboard, and/or a mouse) that may be within the field of view of the camera; and the background segment may include everything else in the camera image.

It is noted that the foreground segment or the background segment may include disjointed (e.g., disconnected or otherwise non-continuous) portions of a camera image. In some configurations, the one or more objects may be considered part of the background segment rather than part of the foreground segment. For simplicity of explanation, the foreground segment is assumed to include the likeness of the user and the background segment is assumed to include the remainder of the image data of the camera image.

As mentioned, the background segment of a camera image may be replaced with a corresponding (e.g., co-located and co-extensive) portion from the VBG. The corresponding portion from the VBG is referred to herein as the "replacement background portion" (RBGP). The foreground segment may be overlaid on the VBG to obtain an output image. Equivalently, or similarly, the foreground segment may be combined with the RB GP to obtain the output image. The output image may be transmitted for display on respective display devices of the other participants.

Hybrid work situations are becoming increasingly common with recent advances of real-time communications software (e.g., for audio-visual conferencing) and network infrastructure and the greater availability of compatible computing devices within the greater workforce. Hybrid work typically refers to a working model where some employees may work partly in a physical workplace and partly remotely. Conferencing software is an enabler to such working models. However, issues exist with audio-visual conferences. For example, remote workers may not feel included and may not be able to participate as equals with other conference participants, such as because the physical environments of the remote workers may be different from those of other participants. To promote conference equity (e.g., the ability for all meeting participants to fully participate and feel included as equals to other participants), it is desirable that audio-visual conferences better support the needs of remote participants.

Conventional conferencing software lack the technical capabilities for solving or for enabling solutions to the above problems. At best, and as described above, conventional conferencing software may merely include technical capabilities that remote participants can use to set VBGs for themselves. As such, a remote participant can appear to other participants as being overlayed on the VBG selected by the remote participant. However, conventional conferencing software do not promote conference equity at least because they do not allow a remote conference participant to bring other conference participants into an environment of the choosing of the remote conference participant. That is, the remote conference participant cannot, for example, set backgrounds for the remote participants when the remote participants are displayed on a device of the remote conference participant.

A conferencing software according to implementations of this disclosure can be used to virtually bring other participants into an environment (i.e., a virtual background) that is of the choosing of a remote participant. As such, to the remote participant, the other participants can be displayed (e.g., appear) as if they were in the environment of the remote participant (or, more broadly, in an environment chosen by the remote participant). That other participants can be displayed as if they were in the environment of the remote participant makes the remote conference participant feel that the other conference participants are in the environment of the remote conference participant therewith promoting (e.g., improving) conference equity since the remote conference participant can feel as being part of the same audio-visual conference as the other participants.

The conferencing software may present (e.g., display) at least some of the other participants in respective tiles on a display of the remote participant. A tile of (e.g., corresponding to) a conference participant is a geometric shape (e.g., a rectangle) that may have a border and within which an image or video of the conference participant is displayed. The tiles are such that the conferencing software sets their tile backgrounds based on the environment of the remote participant, instead of the VBGs set by the at least some of the other participants.

Stated another way, instead of displaying a source output image (which may be a camera image or an output image, as described above) received from a device of a conference participant at the device of the remote participant within a tile of the conference participant, the conferencing software may replace the background of the source image based on a target-background mode that is indicative of a desired environment of the remote participant. A few illustrative examples are now described.

In an example, a remote conference participant may direct the conferencing software to use a rear-facing background mode to set the tile backgrounds for at least some of the other participants when those other participants (i.e., images or representations therefor) are displayed (e.g., within respective tiles) on a device of the remote participant. "Rear-facing background mode" refers to or is indicative of what is behind the remote participant in the physical environment of the remote participant. The rear-facing background mode can be a background as captured in a camera image of the remote participant. That is, the rear-facing background mode can be or can be based on a background segment of a camera image. As such, the other participants can appear to the remote participant to be in, for example, a same room as the remote participant.

In another illustration, a remote conference participant may direct the conferencing software to use a front-facing background mode to set the tile backgrounds for at least some of the other participants when those other participants (i.e., images or representations therefor) are displayed on a device of the remote participant. "Front-facing background mode" refers to or is indicative of what is in front of the remote participant. The front-facing background mode of the remote participant can be an image captured by a rear-facing camera of the camera of the remote participant. That is, the front-facing background mode can be an image of what the remote participant sees in front of them if the view of the remote participant were not obstructed, such as by a monitor. As such, the other participants can appear to be sitting in front of the remote participant.

In an image background mode, a remote conference participant may provide a media item to be used by the conferencing software to set the tile backgrounds. As such, the other participants can appear in the environment chosen by the remote participant. In an own-VBG mode, the VBG of the remote participant can be used to set the tile backgrounds. In a desktop-background mode, a background image of a desktop (e.g., a background of a device), which may be placed in front of the remote participant, may be used to set the tile backgrounds. More, fewer, or other target-background modes are possible.

A "source output image" is a camera image or an output image, as described above, of a conference participant and the background of which is to be replaced based on a target-background mode. A "target output image" refers to the image that results from replacing the background of a source output image based on the target-background mode; the target output image is displayed in a tile. A "target-background mode" refers to a background replacement mode that is indicative of (e.g., representative of, depicting, capturing) a desired environment of a target conference participant. A "local background replacement image" (LBGRI) refers to a background replacement media item that is (e.g., selected, chosen, or set) based on the target-background mode. A "target conference participant" (e.g., a remote conference participant) refers to a conference participant to whom other conference participants are displayed using the target-background mode, which may be selected by the target conference participant. "Other conference participant(s)" refers to conference participant(s) other than the target conference participant. A "likeness" of a conference participant broadly refers to or includes a representation indicative of the conference participant, such as a portrait, an image, an avatar, a body definition, a contour, or any such representation of the conference participant.

The disclosure herein is described mainly from a perspective of a particular target conference participant. However, any number of conference participants can simultaneously be target conference participants. An audio-visual conference will include at least a first user and a second user. From the perspective of the first user, the first user can be a target conference participant and the second user would be the other conference participant. Simultaneously, the second user can be a target conference participant and the first user would be the other conference participant.

To describe some implementations in greater detail, reference is first made to examples of hardware and software structures used to implement virtual background rendering based on the target-background mode. FIG. 1 is a block diagram of an example of an electronic computing and communications system 100, which can be or include a distributed computing system (e.g., a client-server computing system), a cloud computing system, a clustered computing system, or the like.

The system 100 includes one or more customers, such as customers 102A through 102B, which may each be a public entity, private entity, or another corporate entity or individual that purchases or otherwise uses software services, such as of a unified communications as a service (UCaaS) platform provider. Each customer can include one or more clients. For example, as shown and without limitation, the customer 102A can include clients 104A through 104B, and the customer 102B can include clients 104C through 104D. A customer can include a customer network or domain. For example, and without limitation, the clients 104A through 104B can be associated or communicate with a customer network or domain for the customer 102A and the clients 104C through 104D can be associated or communicate with a customer network or domain for the customer 102B.

A client, such as one of the clients 104A through 104D, may be or otherwise refer to one or both of a client device or a client application. Where a client is or refers to a client device, the client can comprise a computing system, which can include one or more computing devices, such as a mobile phone, a tablet computer, a laptop computer, a notebook computer, a desktop computer, or another suitable computing device or combination of computing devices. Where a client instead is or refers to a client application, the client can be an instance of software running on a customer device (e.g., a client device or another device). In some implementations, a client can be implemented as a single physical unit or as a combination of physical units. In some implementations, a single physical unit can include multiple clients.

The system 100 can include a number of customers and/or clients or can have a configuration of customers or clients different from that generally illustrated in FIG. 1. For example, and without limitation, the system 100 can include hundreds or thousands of customers, and at least some of the customers can include or be associated with a number of clients.

The system 100 includes a datacenter 106, which may include one or more servers. The datacenter 106 can represent a geographic location, which can include a facility, where the one or more servers are located. The system 100 can include a number of datacenters and servers or can include a configuration of datacenters and servers different from that generally illustrated in FIG. 1. For example, and without limitation, the system 100 can include tens of datacenters, and at least some of the datacenters can include hundreds or another suitable number of servers. In some implementations, the datacenter 106 can be associated or communicate with one or more datacenter networks or domains, which can include domains other than the customer domains for the customers 102A through 102B.

The datacenter 106 includes servers used for implementing software services of a UCaaS platform. The datacenter 106 as generally illustrated includes an application server 108, a database server 110, and a telephony server 112. The servers 108 through 112 can each be a computing system, which can include one or more computing devices, such as a desktop computer, a server computer, or another computer capable of operating as a server, or a combination thereof. A suitable number of each of the servers 108 through 112 can be implemented at the datacenter 106. The UCaaS platform uses a multi-tenant architecture in which installations or instantiations of the servers 108 through 112 is shared amongst the customers 102A through 102B.

In some implementations, one or more of the servers 108 through 112 can be a non-hardware server implemented on a physical device, such as a hardware server. In some implementations, a combination of two or more of the application server 108, the database server 110, and the telephony server 112 can be implemented as a single hardware server or as a single non-hardware server implemented on a single hardware server. In some implementations, the datacenter 106 can include servers other than or in addition to the servers 108 through 112, for example, a media server, a proxy server, or a web server.

The application server 108 runs web-based software services deliverable to a client, such as one of the clients 104A through 104D. As described above, the software services may be of a UCaaS platform. For example, the application server 108 can implement all or a portion of a UCaaS platform, including conferencing software, messaging software, and/or other intra-party or inter-party communications software. The application server 108 may, for example, be or include a unitary Java Virtual Machine (JVM).

In some implementations, the application server 108 can include an application node, which can be a process executed on the application server 108. For example, and without limitation, the application node can be executed in order to deliver software services to a client, such as one of the clients 104A through 104D, as part of a software application. The application node can be implemented using processing threads, virtual machine instantiations, or other computing features of the application server 108. In some such implementations, the application server 108 can include a suitable number of application nodes, depending upon a system load or other characteristics associated with the application server 108. For example, and without limitation, the application server 108 can include two or more nodes forming a node cluster. In some such implementations, the application nodes implemented on a single application server 108 can run on different hardware servers.

The database server 110 stores, manages, or otherwise provides data for delivering software services of the application server 108 to a client, such as one of the clients 104A through 104D. In particular, the database server 110 may implement one or more databases, tables, or other information sources suitable for use with a software application implemented using the application server 108. The database server 110 may include a data storage unit accessible by software executed on the application server 108. A database implemented by the database server 110 may be a relational database management system (RDBMS), an object database, an XML database, a configuration management database (CMDB), a management information base (MIB), one or more flat files, other suitable non-transient storage mechanisms, or a combination thereof. The system 100 can include one or more database servers, in which each database server can include one, two, three, or another suitable number of databases configured as or comprising a suitable database type or combination thereof.

In some implementations, one or more databases, tables, other suitable information sources, or portions or combinations thereof may be stored, managed, or otherwise provided by one or more of the elements of the system 100 other than the database server 110, for example, the client 104 or the application server 108.

The telephony server 112 enables network-based telephony and web communications from and to clients of a customer, such as the clients 104A through 104B for the customer 102A or the clients 104C through 104D for the customer 102B. Some or all of the clients 104A through 104D may be voice over internet protocol (VOIP)-enabled devices configured to send and receive calls over a network 114. In particular, the telephony server 112 includes a session initiation protocol (SIP) zone and a web zone. The SIP zone enables a client of a customer, such as the customer 102A or 102B, to send and receive calls over the network 114 using SIP requests and responses. The web zone integrates telephony data with the application server 108 to enable telephony-based traffic access to software services run by the application server 108. Given the combined functionality of the SIP zone and the web zone, the telephony server 112 may be or include a cloud-based private branch exchange (PBX) system.

The SIP zone receives telephony traffic from a client of a customer and directs same to a destination device. The SIP zone may include one or more call switches for routing the telephony traffic. For example, to route a VOIP call from a first VOIP-enabled client of a customer to a second VOIP-enabled client of the same customer, the telephony server 112 may initiate a SIP transaction between a first client and the second client using a PBX for the customer. However, in another example, to route a VOIP call from a VOIP-enabled client of a customer to a client or non-client device (e.g., a desktop phone which is not configured for VOIP communication) which is not VOIP-enabled, the telephony server 112 may initiate a SIP transaction via a VOIP gateway that transmits the SIP signal to a public switched telephone network (PSTN) system for outbound communication to the non-VOIP-enabled client or non-client phone. Hence, the telephony server 112 may include a PSTN system and may in some cases access an external PSTN system.

The telephony server 112 includes one or more session border controllers (SBCs) for interfacing the SIP zone with one or more aspects external to the telephony server 112. In particular, an SBC can act as an intermediary to transmit and receive SIP requests and responses between clients or non-client devices of a given customer with clients or non-client devices external to that customer. When incoming telephony traffic for delivery to a client of a customer, such as one of the clients 104A through 104D, originating from outside the telephony server 112 is received, a SBC receives the traffic and forwards it to a call switch for routing to the client.

In some implementations, the telephony server 112, via the SIP zone, may enable one or more forms of peering to a carrier or customer premise. For example, Internet peering to a customer premise may be enabled to ease the migration of the customer from a legacy provider to a service provider operating the telephony server 112. In another example, private peering to a customer premise may be enabled to leverage a private connection terminating at one end at the telephony server 112 and at the other end at a computing aspect of the customer environment. In yet another example, carrier peering may be enabled to leverage a connection of a peered carrier to the telephony server 112.

In some such implementations, a SBC or telephony gateway within the customer environment may operate as an intermediary between the SBC of the telephony server 112 and a PSTN for a peered carrier. When an external SBC is first registered with the telephony server 112, a call from a client can be routed through the SBC to a load balancer of the SIP zone, which directs the traffic to a call switch of the telephony server 112. Thereafter, the SBC may be configured to communicate directly with the call switch.

The web zone receives telephony traffic from a client of a customer, via the SIP zone, and directs same to the application server 108 via one or more Domain Name System (DNS) resolutions. For example, a first DNS within the web zone may process a request received via the SIP zone and then deliver the processed request to a web service which connects to a second DNS at or otherwise associated with the application server 108. Once the second DNS resolves the request, it is delivered to the destination service at the application server 108. The web zone may also include a database for authenticating access to a software application for telephony traffic processed within the SIP zone, for example, a softphone.

The clients 104A through 104D communicate with the servers 108 through 112 of the datacenter 106 via the network 114. The network 114 can be or include, for example, the Internet, a local area network (LAN), a wide area network (WAN), a virtual private network (VPN), or another public or private means of electronic computer communication capable of transferring data between a client and one or more servers. In some implementations, a client can connect to the network 114 via a communal connection point, link, or path, or using a distinct connection point, link, or path. For example, a connection point, link, or path can be wired, wireless, use other communications technologies, or a combination thereof.

The network 114, the datacenter 106, or another element, or combination of elements, of the system 100 can include network hardware such as routers, switches, other network devices, or combinations thereof. For example, the datacenter 106 can include a load balancer 116 for routing traffic from the network 114 to various servers associated with the datacenter 106. The load balancer 116 can route, or direct, computing communications traffic, such as signals or messages, to respective elements of the datacenter 106.

For example, the load balancer 116 can operate as a proxy, or reverse proxy, for a service, such as a service provided to one or more remote clients, such as one or more of the clients 104A through 104D, by the application server 108, the telephony server 112, and/or another server. Routing functions of the load balancer 116 can be configured directly or via a DNS. The load balancer 116 can coordinate requests from remote clients and can simplify client access by masking the internal configuration of the datacenter 106 from the remote clients.

In some implementations, the load balancer 116 can operate as a firewall, allowing or preventing communications based on configuration settings. Although the load balancer 116 is depicted in FIG. 1 as being within the datacenter 106, in some implementations, the load balancer 116 can instead be located outside of the datacenter 106, for example, when providing global routing for multiple datacenters. In some implementations, load balancers can be included both within and outside of the datacenter 106. In some implementations, the load balancer 116 can be omitted.

Figure 2:
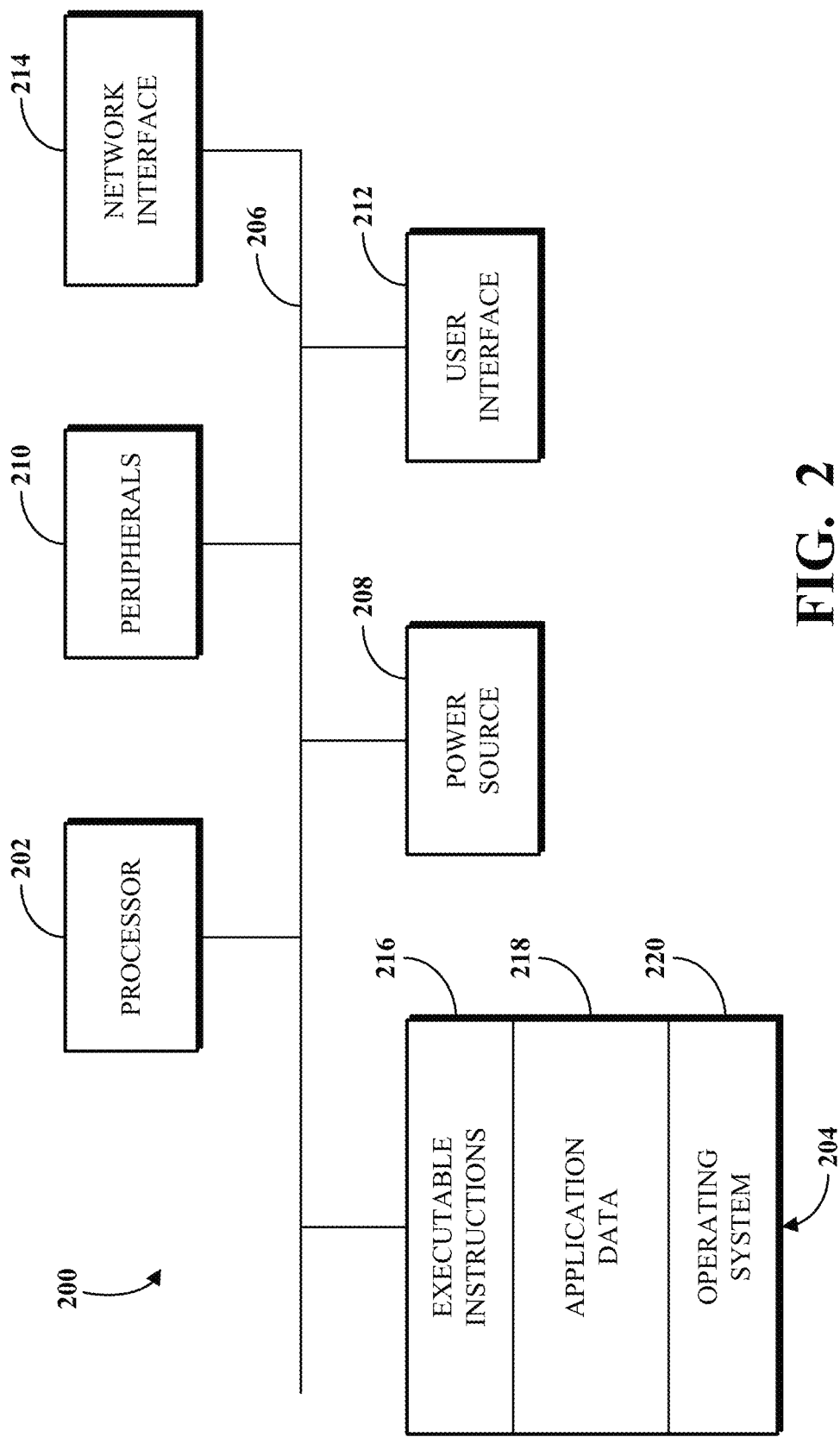
FIG. 2 is a block diagram of an example internal configuration of a computing device of an electronic computing and communications system.

FIG. 2 is a block diagram of an example internal configuration of a computing device 200 of an electronic computing and communications system. In one configuration, the computing device 200 may implement one or more of the client 104, the application server 108, the database server 110, or the telephony server 112 of the system 100 shown in FIG. 1.

The computing device 200 includes components or units, such as a processor 202, a memory 204, a bus 206, a power source 208, peripherals 210, a user interface 212, a network interface 214, other suitable components, or a combination thereof. One or more of the memory 204, the power source 208, the peripherals 210, the user interface 212, or the network interface 214 can communicate with the processor 202 via the bus 206.

The processor 202 is a central processing unit, such as a microprocessor, and can include single or multiple processors having single or multiple processing cores. Alternatively, the processor 202 can include another type of device, or multiple devices, configured for manipulating or processing information. For example, the processor 202 can include multiple processors interconnected in one or more manners, including hardwired or networked. The operations of the processor 202 can be distributed across multiple devices or units that can be coupled directly or across a local area or other suitable type of network. The processor 202 can include a cache, or cache memory, for local storage of operating data or instructions.

The memory 204 includes one or more memory components, which may each be volatile memory or non-volatile memory. For example, the volatile memory can be random access memory (RAM) (e.g., a DRAM module, such as DDR SDRAM). In another example, the non-volatile memory of the memory 204 can be a disk drive, a solid-state drive, flash memory, or phase-change memory. In some implementations, the memory 204 can be distributed across multiple devices. For example, the memory 204 can include network-based memory or memory in multiple clients or servers performing the operations of those multiple devices.

The memory 204 can include data for immediate access by the processor 202. For example, the memory 204 can include executable instructions 216, application data 218, and an operating system 220. The executable instructions 216 can include one or more application programs, which can be loaded or copied, in whole or in part, from non-volatile memory to volatile memory to be executed by the processor 202. For example, the executable instructions 216 can include instructions for performing some or all of the techniques of this disclosure. The application data 218 can include user data, database data (e.g., database catalogs or dictionaries), or the like. In some implementations, the application data 218 can include functional programs, such as a web browser, a web server, a database server, another program, or a combination thereof. The operating system 220 can be, for example, Microsoft Windows®, Mac OS X®, or Linux®; an operating system for a mobile device, such as a smartphone or tablet device; or an operating system for a non-mobile device, such as a mainframe computer.

The power source 208 provides power to the computing device 200. For example, the power source 208 can be an interface to an external power distribution system. In another example, the power source 208 can be a battery, such as where the computing device 200 is a mobile device or is otherwise configured to operate independently of an external power distribution system. In some implementations, the computing device 200 may include or otherwise use multiple power sources. In some such implementations, the power source 208 can be a backup battery.

The peripherals 210 includes one or more sensors, detectors, or other devices configured for monitoring the computing device 200 or the environment around the computing device 200. For example, the peripherals 210 can include a geolocation component, such as a global positioning system location unit. In another example, the peripherals can include a temperature sensor for measuring temperatures of components of the computing device 200, such as the processor 202. In some implementations, the computing device 200 can omit the peripherals 210.

The user interface 212 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 214 provides a connection or link to a network (e.g., the network 114 shown in FIG. 1). The network interface 214 can be a wired network interface or a wireless network interface. The computing device 200 can communicate with other devices via the network interface 214 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof.

Figure 3:
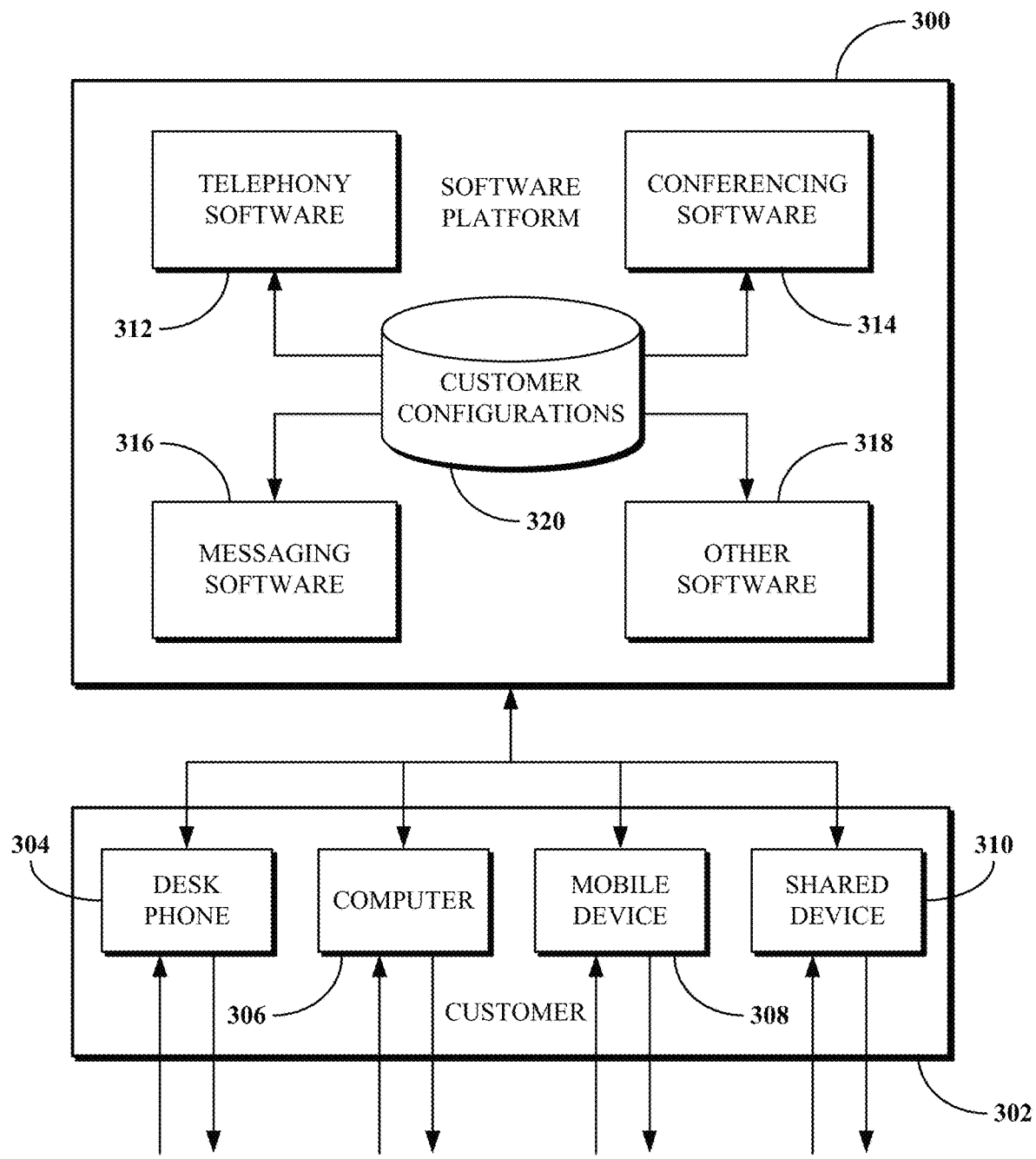
FIG. 3 is a block diagram of an example of a software platform implemented by an electronic computing and communications system.

FIG. 3 is a block diagram of an example of a software platform 300 implemented by an electronic computing and communications system, for example, the system 100 shown in FIG. 1. The software platform 300 is a UCaaS platform accessible by clients of a customer of a UCaaS platform provider, for example, the clients 104A through 104B of the customer 102A or the clients 104C through 104D of the customer 102B shown in FIG. 1. The software platform 300 may be a multi-tenant platform instantiated using one or more servers at one or more datacenters including, for example, the application server 108, the database server 110, and the telephony server 112 of the datacenter 106 shown in FIG. 1.

The software platform 300 includes software services accessible using one or more clients. For example, a customer 302 as shown includes four clients—a desk phone 304, a computer 306, a mobile device 308, and a shared device 310. The desk phone 304 is a desktop unit configured to at least send and receive calls and includes an input device for receiving a telephone number or extension to dial to and an output device for outputting audio and/or video for a call in progress. The computer 306 is a desktop, laptop, or tablet computer including an input device for receiving some form of user input and an output device for outputting information in an audio and/or visual format. The mobile device 308 is a smartphone, wearable device, or other mobile computing aspect including an input device for receiving some form of user input and an output device for outputting information in an audio and/or visual format. The desk phone 304, the computer 306, and the mobile device 308 may generally be considered personal devices configured for use by a single user. The shared device 310 is a desk phone, a computer, a mobile device, or a different device which may instead be configured for use by multiple specified or unspecified users.

Each of the clients 304 through 310 includes or runs on a computing device configured to access at least a portion of the software platform 300. In some implementations, the customer 302 may include additional clients not shown. For example, the customer 302 may include multiple clients of one or more client types (e.g., multiple desk phones or multiple computers) and/or one or more clients of a client type not shown in FIG. 3 (e.g., wearable devices or televisions other than as shared devices). For example, the customer 302 may have tens or hundreds of desk phones, computers, mobile devices, and/or shared devices.

The software services of the software platform 300 generally relate to communications tools, but are in no way limited in scope. As shown, the software services of the software platform 300 include telephony software 312, conferencing software 314, messaging software 316, and other software 318. Some or all of the software 312 through 318 uses customer configurations 320 specific to the customer 302. The customer configurations 320 may, for example, be data stored within a database or other data store at a database server, such as the database server 110 shown in FIG. 1.

The telephony software 312 enables telephony traffic between ones of the clients 304 through 310 and other telephony-enabled devices, which may be other ones of the clients 304 through 310, other VOIP-enabled clients of the customer 302, non-VOIP-enabled devices of the customer 302, VOIP-enabled clients of another customer, non-VOIP-enabled devices of another customer, or other VOIP-enabled clients or non-VOIP-enabled devices. Calls sent or received using the telephony software 312 may, for example, be sent or received using the desk phone 304, a softphone running on the computer 306, a mobile application running on the mobile device 308, or using the shared device 310 that includes telephony features.

The telephony software 312 further enables phones that do not include a client application to connect to other software services of the software platform 300. For example, the telephony software 312 may receive and process calls from phones not associated with the customer 302 to route that telephony traffic to one or more of the conferencing software 314, the messaging software 316, or the other software 318.

The conferencing software 314 enables audio, video, and/or other forms of conferences between multiple participants, such as to facilitate a conference between those participants. In some cases, the participants may all be physically present within a single location, for example, a conference room, in which the conferencing software 314 may facilitate a conference between only those participants and using one or more clients within the conference room. In some cases, one or more participants may be physically present within a single location and one or more other participants may be remote, in which the conferencing software 314 may facilitate a conference between all of those participants using one or more clients within the conference room and one or more remote clients. In some cases, the participants may all be remote, in which the conferencing software 314 may facilitate a conference between the participants using different clients for the participants. The conferencing software 314 can include functionality for hosting, presenting scheduling, joining, or otherwise participating in a conference. The conferencing software 314 may further include functionality for recording some or all of a conference and/or documenting a transcript for the conference.

The messaging software 316 enables instant messaging, unified messaging, and other types of messaging communications between multiple devices, such as to facilitate a chat or other virtual conversation between users of those devices. The unified messaging functionality of the messaging software 316 may, for example, refer to email messaging which includes a voicemail transcription service delivered in email format.

The other software 318 enables other functionality of the software platform 300. Examples of the other software 318 include, but are not limited to, device management software, resource provisioning and deployment software, administrative software, third party integration software, and the like. In one particular example, the other software 318 can include virtual background software, for example, for setting the virtual background of a target conference participant using the virtual background of source conference participant or spreading a virtual background to multiple conference participants.

The software 312 through 318 may be implemented using one or more servers, for example, of a datacenter such as the datacenter 106 shown in FIG. 1. For example, one or more of the software 312 through 318 may be implemented using an application server, a database server, and/or a telephony server, such as the servers 108 through 112 shown in FIG. 1. In another example, one or more of the software 312 through 318 may be implemented using servers not shown in FIG. 1, for example, a meeting server, a web server, or another server. In yet another example, one or more of the software 312 through 318 may be implemented using one or more of the servers 108 through 112 and one or more other servers. The software 312 through 318 may be implemented by different servers or by the same server.

Features of the software services of the software platform 300 may be integrated with one another to provide a unified experience for users. For example, the messaging software 316 may include a user interface element configured to initiate a call with another user of the customer 302. In another example, the telephony software 312 may include functionality for elevating a telephone call to a conference. In yet another example, the conferencing software 314 may include functionality for sending and receiving instant messages between participants and/or other users of the customer 302. In yet another example, the conferencing software 314 may include functionality for file sharing between participants and/or other users of the customer 302. In some implementations, some or all of the software 312 through 318 may be combined into a single software application run on clients of the customer, such as one or more of the clients 304 through 310.

Figure 4:
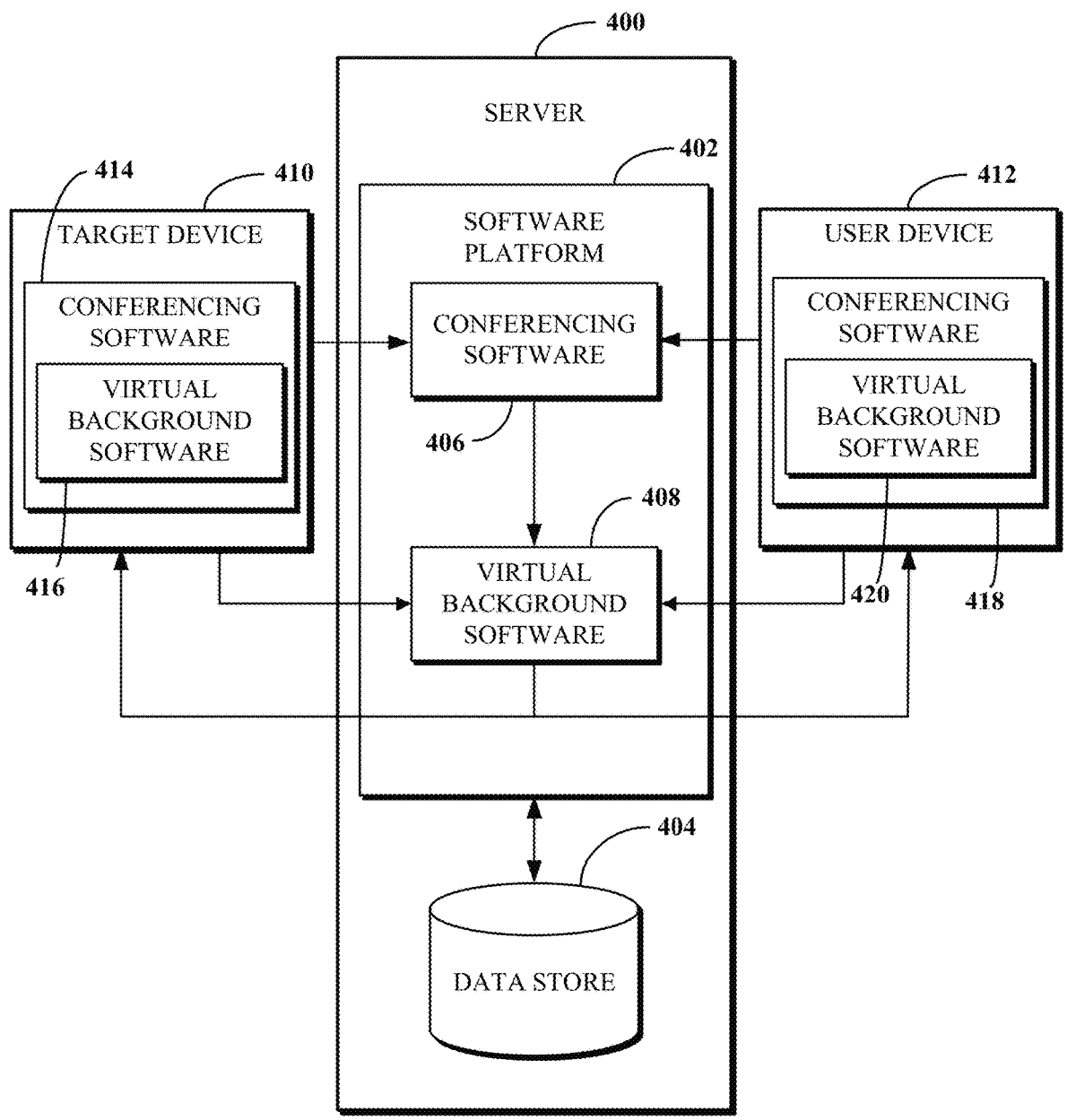
FIG. 4 is block diagrams of an example of a server for rendering a virtual background for a conference participant based on a target-background mode of a target participant.

FIG. 4 is a block diagram of an example of a server 400 for rendering a virtual background for a conference participant based on a target-background mode of a target participant. The server 400 enables users to participate in (e.g., virtually join) audio-visual conferences. In an audio-visual conference, at least one participant may have their camera enabled. Source output images of the at least one conference participant may be transmitted to at least some of the other conference participants based on camera images of the at least one conference participant.

As shown, two conference participants (e.g., a target conference participant and another conference participant) using respective user devices (e.g., a target device 410 and a user device 412), may be participating in a conference. However, as can be appreciated, many more user devices may simultaneously connect to a conference. Similarly, a software platform 402 implemented using the server 400 can enable many conferences to be concurrently active. As further described below, the other conference participant (i.e., a representation therefor) is rendered on the target device 410 using a target-background mode of (e.g., set by, selected by, configured by, set for, selected for, or configured for) the target participant.

The target-background mode may be obtained (e.g., selected, set, received or determined). In an example, the target conference participant may set the target-background mode. In another example, the target-background mode may be set at, by, or according to a configuration of the server 400. The target-background mode can be used to construct target output images of the other conference participant for display at the target device 410. That is, a likeness of the other conference participant is combined with (e.g., overlaid on) an LBGRI that is based on the target participant view (i.e., a target-background mode) to obtain a target output image that is displayed at the target device 410. To be clear, and as described above, the background of a source output image (whether it is or is not a virtual background) is replaced based on the target-background mode to obtain a target output image that is to be displayed at the target device 410. As such, a virtual background for the other conference participant is rendered at the target device 410 using (e.g., based on) the target-background mode.

In an example, the server 400 may receive respective source output images of respective other conference participants, obtain (e.g., generate) respective target output images from the respective source output images based on the target-background mode of the target conference participant, and transmit the respective target output images for display at the target device 410 of the target conference participant. In another example, the server 400 may obtain the respective source output images of respective other conference participants and transmit the respective source output images to the target device 410. Conferencing software 414 of the target device 410 can be used to obtain the target output images based on the target-background mode.

Obtaining a target output image from a source output image can include obtaining a segmentation of the source output image into a source-foreground segment and a source-background segment. A source-foreground segment is the set of pixels of the source output image that are determined (e.g., calculated, inferred, or classified) to be foreground pixels. A source-background segment can be the set of all pixels that are not included in a source-foreground segment. The pixels of the source-foreground segment may not be a connected set of pixels that can be enclosed in a single convex envelop that does not contain non-foreground pixels. The source output image may itself include a VBG, which is to be replaced based on the target-background mode.

As shown, the server 400 implements or includes the software platform 402 and a data store 404. The server 400 can be one or more servers implemented by or included in a datacenter, such as the datacenter 106 of FIG. 1. The server 400 is shown as including (e.g., running) a conferencing software 406 and a VBG software 408.

The software platform 402 provides conferencing services (e.g., capabilities or functionality) via the conferencing software 406. The software platform 402 can be or can be part of the software platform 300 of FIG. 3. The conferencing software 406 can be variously implemented in connection with the software platform 402. In some implementations, the conferencing software 406 can be included in or can work in conjunction with one or more of the telephony software 312, the messaging software 316, or the other software 318 of FIG. 3. For example, the conferencing software 406 may be or may be integrated within the telephony software 312. In another example, the conferencing software 406 may be or may be integrated within the conferencing software 314.

The VBG software 408 can be used to set or to facilitate the setting of virtual backgrounds of other conference participants for display at the target device 410 of the target conference participant based on a target-background mode of the target conference participant. In an example, the VBG software 408 may receive an indication of the target-background mode. The indication can be or include whether to use a front-facing background mode, a rear-facing background mode, an image background mode, a VBG mode, a desktop background mode, or some other target-background mode.

The data store 404 can store data related to conferences and data related to users, who have participated or may participate in one or more conferences. The data store 404 can be included in or implemented by a database server, such as the database server 110 of FIG. 1. The data store 404 can include data related to scheduled or ongoing conferences and data related to users of the software platform 402. For example, the data store 404 can include associations between users and target-background modes (e.g., target-background mode preferences). To illustrate, the data store 404 may store, with respect to a user, a preference indicating that a front-facing background mode is to be used for the user in all conferences that the user participates in. As another illustration, the data store 404 may store an indication of a media item to use in the image background mode and that is to be used for conferences scheduled to occur within a date range. The data store 404 can store other associations between users and target-background modes.

The target device 410 can be a device of a user who is configured (e.g., enabled) to or otherwise can join a conference. The target device 410 may, for example, be one of the clients 304 through 310 of FIG. 3. Alternatively, the target device 410 may be a device other than a client device. The target device 410 may include a conferencing software 414. The conferencing software 414 can include or work in conjunction with a VBG software 416. The target device 410 can include a camera device (not shown) that can be configured to capture images of the user while the user is in a conference. At least some of the camera images (or output images obtained therefrom) may be transmitted by the target device 410 to the server 400. The camera device can include a front-facing camera and a rear-facing camera. The front-facing camera can capture images of the target conference participant; and the rear-facing camera faces away from the target conference participant and can capture objects or scenes in the view of the target conference participant. The conferencing software 414 can cause target output images to be displayed on a display of the target device 410.

In some implementations, the target device 410 may communicate directly with the devices of other participants, such as a user device 412. The target device 410 can directly communicate with the user device 412 using peer-to-peer, real-time communications. As such, for example, source output images obtained at the user device 412 can be received directly at the target device 410, and vice versa. The user device 412 can be similar to the target device 410. As such, the user device 412 can include a conferencing software 418 that can be similar to the conferencing software 414, and can include a VBG software 420 that can be similar to the VBG software 416.

Figure 5:
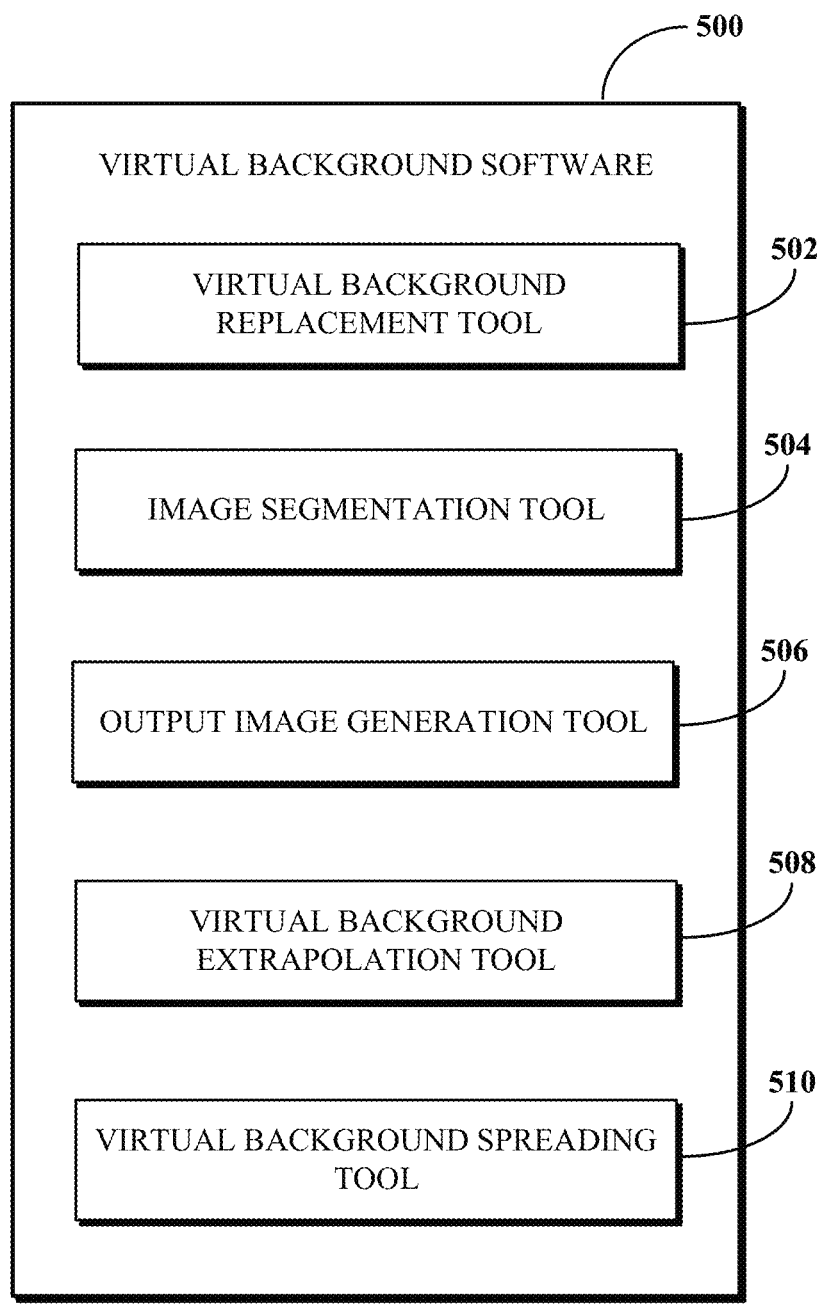
FIG. 5 is a block diagram of example functionality of virtual background software.

FIG. 5 is a block diagram of example functionality of VBG software 500, which may be, for example, one or more of the VBG software 408, the VBG software 416, or the VBG software 420. The VBG software 500 includes tools, such as programs, subprograms, functions, routines, subroutines, operations, executable instructions, and/or the like for, inter alia and as further described below, setting tile backgrounds of other conference participants displayed at a target device of a target conference participant based on a target-background mode of the target conference participant.

At least some of the tools of the VBG software 500 can be implemented as respective software programs that may be executed by one or more computing devices, such as the computing device 200 of FIG. 2. A software program can include machine-readable instructions that may be stored in a memory such as the memory 204, and that, when executed by a processor, such as processor 202, may cause the computing device to perform the instructions of the software program.

As shown, the VBG software 500 includes a VBG replacement tool 502, an image segmentation tool 504, an output image generation tool 506, a VBG extrapolation tool 508, and a VBG spreading tool 510. In some implementations, the VBG software 500 can include more or fewer tools. In some implementations, some of the tools may be combined, some of the tools may be split into more tools, or a combination thereof. Statements herein such as "a tool/software/etc. of a target conference participant" should be understood to mean a "a tool/software/etc. that is executing or is available at a target device of the target conference participant." The tools 502-510 are described with reference to FIGS. 6A-6E.

FIGS. 6A-6B and 6C-6E illustrate examples of user interfaces (UIs) of a conferencing software, for example, the conferencing software 314 of FIG. 3 or the conferencing software 406 of FIG. 4. The UIs shown in FIGS. 6A-6B and 6C-6E can be displayed on a device of the target conference participant. The UIs shown in FIGS. 6A-6B and 6C-6E illustrate a conference that includes four participants, as shown in a UI 600 of FIG. 6A. Each of the participant can be represented by a respective tile. The target conference participant is represented by a target participant 602D tile; and the other conference participants are represented by a participant 602A tile, a participant 602B tile, and a participant 602C tile, respectively. For brevity and ease of description, statements such as "the participant 602A <verb>" should be understood to mean that the "participant represented by the participant 602A tile <verb>."

The participant 602A, the participant 602C, and the target participant 602D, have turned on their respective cameras and, as such, respective output images of these participants are displayed in the corresponding tiles on respective devices of other participants. The participant 602B has not turned on their camera. As such, the corresponding tile of the participant 602B shows an identifier (e.g., PARTICIPANT 2) instead of an image of the participant 602B. The UIs of the conferencing software may include a main stage 604 and a participant list 606. The indication (e.g., a UI control, an icon, a label, an output image, or a tile) of the participant currently speaking may be displayed in the main stage 604 and the non-speaking participants may be listed in the participant list 606.

The UI 600 illustrates that a displayed background 610 of the target participant 602D includes mountains and a forest. In an example, the displayed background 610 may be a VBG that is selected by the target participant 602D. In another example, the displayed background 610 may be an image of the actual background of the target participant 602D as captured by a front-facing camera of the device of the target participant 602D. The output image displayed in the main stage 604 includes a foreground segment 608, which is or includes the portrait (e.g., likeness) of the target participant 602D and the displayed background 610.

While the conference participant that is shown in the main stage 604 is described as the target participant, this disclosure is not so limited and any other conference participant, whether in the main stage 604 or the participant list 606 can be a target participant. Additionally, while the target participant 602D is not listed in the participant list 606, in some implementations, the conference participant shown in the main stage 604 may additionally be included in the participant list 606. Additionally, in some implementations, a UI of the conferencing software may not include at least one of a main stage or a participant list.

The target conference participant may have available commands, such as one or more of the commands 612, that can be used for, or in conjunction with, rendering a virtual background for a conference participant based on the target-background mode of the target participant. The commands 612 is shown as including the commands 614-624. However, more or fewer commands may be available. The VBG software 416 of the target device 410, or the VBG software 408 of the server 400, may cause the commands 612 to be presented on a device of the target conference participant, such as the target device 410 of FIG. 4. The commands 612 may be presented in any number of ways and may be presented using different user control elements (e.g., buttons or menu items). A respective user flow (not illustrated) may be associated with each of the commands 612 for an optimal user experience.

Returning again to FIG. 5, the VBG replacement tool 502 can obtain a target-background mode for the target participant. The target conference participant may select the target-background mode for a particular conference. For example, in the process of joining or at any time during the conference, the target conference participant may select the target-background mode. In another example, the target conference participant may set a target-background mode preference such that the target-background mode that is set as a preference may be, by default, used when the target conference participant joins any conference. An LBGRI may be set (e.g., selected, configured, or determined) based on the target-background mode. The LBGRI can be as a static or a moving image. The LBGRI can be an image file, a video file, a link to a streamed video, or an animated image (e.g., Graphics Interchange Format (GIF) image).

The target-background mode can be or can be set to the front-facing background mode, such as responsive to a selection by the target conference participant of the command 614 (labeled "SET TO FRONT VIEW"). In an example, in response to the command 614, a camera image may be obtained from the camera of the device of the target conference participant. The LBGRI can be or can be set using the camera image.

The target-background mode can be or can be set to the rear-facing background mode, such as responsive to a selection by the target conference participant of the command 616 (labeled "SET TO REAR VIEW"). In an example, in response to the command 616, an image may be obtained from a rear-facing camera of the device of the target user. The LBGRI can be set using the image obtained from the rear-facing camera.

The VBG mode can be set responsive to a selection by the target conference participant of the command 618 (labeled "SET TO MY BG"). In the VBG mode, the LBGRI can be set to a same-background view that is used by the target participant. For example, in a case that the target participant is using a VBG, then the LBGRI can be set to the same VBG; in a case that the target participant is using, as a VBG, a blurred background of the actual background, then the LBGRI is set to the same blurred background; and in a case that the target participant is not using a VBG, then the LBGRI can be set as in the case of the front-facing background mode. In the case that the target participant does not have their camera turned on, the camera may be used to obtain an LBGRI according to the target-background mode without transferring any images used to obtain the LBGRI to the other conference participants.

The image background mode can be set responsive to a selection by the target conference participant of the command 620 (labeled "SET TO IMAGE . . . "). In the image background mode, the LBGRI can be set to an arbitrary image (or, more broadly, a media item) provided by the target participant, such as responsive to the target conference participant selection of the command 620 (labeled "SET TO IMAGE . . . "). UIs (not shown) of the VBG software 500 can be used by the target conference participant to provide the arbitrary image. In an example, the UI may be a file selector that allows the user to select the media item. In an example, the UI can be or can enable to perform a media search and select one of the search results to use as the media item.

The LBGRI can be set based on a desktop-background mode, such as responsive to a selection by the target conference participant of the command 622. That is, the LBGRI can be set to an image that is used as a background of a monitor connected to the target device and used by the target conference participant to join the conference. To illustrate, the target conference participant may use three monitors where a middle monitor is used to display UIs of the conferencing software. By using the desktop-background mode, the other conference participants can appear to be part of the background of the desktop therewith providing an immersive experience to the target conference participant.

In an example, the LBGRI may be transmitted to a server, such as the server 400 so that VBG software 408 therein can generate the target output images. In another example, the LBGRI is not transmitted to the server 400. Rather, the target output images are generated at the target device 410, such as by the VBG software 416.

The image segmentation tool 504 may obtain a segmentation of an image. Segmenting an image can include obtaining a foreground segment, a background segment, or both from the image. The image segmentation tool 504 can be used to segment a source output image to obtain a source foreground segment from the source output image. The foreground segment includes a likeness of a conference participant. The source output image would be displayed by the conferring software at the target device 410 in cases where a target-background mode is not set. When a target-background mode is set, the source output image would be processed as described herein to obtain a target output image.

The source foreground segment is combined with the LBGRI (or a background thereof) to obtain the target output image. In some situations, no source output image may be received for a conference participant, such as described with respect to the participant 602B of FIG. 6A. As such, the image segmentation tool 504 may not obtain a segmentations for such conference participants.

In some situations, the image segmentation tool 504 can also be used to obtain a segmentation of the LBGRI, such as in cases where the LBGRI includes the target participant (i.e., a likeness of the target participant). Whether the LBGRI includes the target participant can be inferred based on the target-background mode, the VBG setting of the target participant, or both. For example, if the front-facing background mode or the same-background view is used, then the LBGRI likely includes the target participant and is, therefore, segmented. Otherwise, the LBGRI is not determined to include the target participant and may not need to be segmented.

The LBGRI may be segmented to obtain a target background segment that is to be combined with the source foreground segment obtained from the source output image. For brevity and ease of reference, that an LBGRI is combined with the source foreground segment includes a first case where the LBGRI is not segmented and the foreground segment is combined with the whole of the LBGRI, and a second case where the source foreground segment is combined with the target background segment of the LBGRI.

In an example, the image segmentation tool 504 may be or may use a machine learning model that is trained to identify a likeness of a user, who may be facing the camera. In an example, the image segmentation tool 504 may use a service (e.g., a cloud-based service) to obtain the segmentation. To restate, a source output image may be segmented to obtain at least a source foreground segment; and an LBGRI may be segmented to obtain at least a target background segment. Again, the target background segment may be the whole of the LBGRI.

In an example, the source foreground segment may be an image mask where the pixels of the portrait retain their values and all other pixels are set to a certain color value (e.g., black or white) that facilitates image operations (e.g., adding images or replacing an area defined by such pixels with another image portion). In an example, the target background segment obtained from the LBGRI may be an image mask where the pixels of the portrait are set to the certain value and all other pixels retain their values from the LBGRI. In an example, an image mask may be a binary image where the pixels of one portion are assigned a first value (e.g., one) and the pixels of the other portion are assigned a second value (e.g., zero).

Figure 6A:
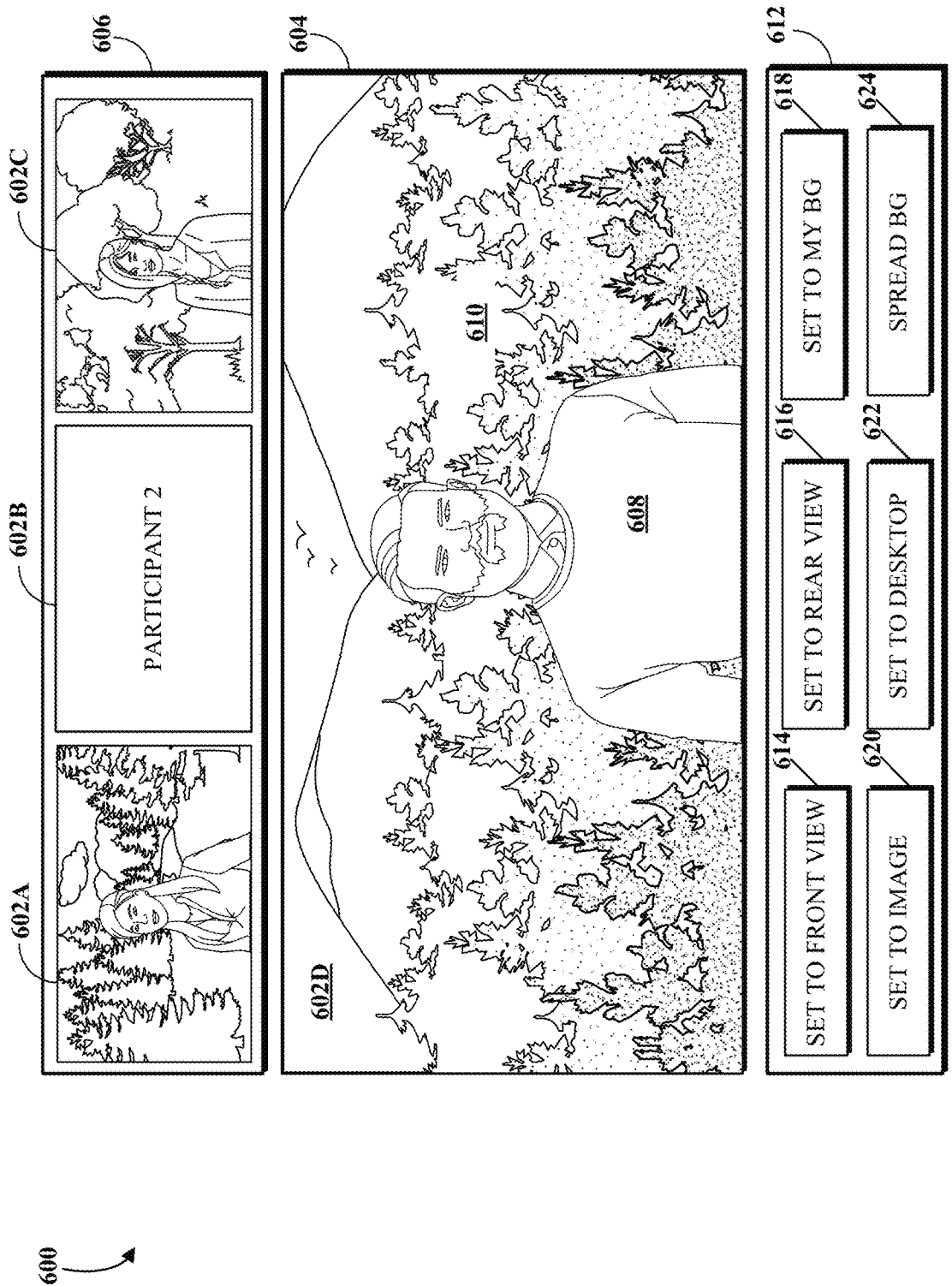
FIGS. 6A-6B illustrate examples of user interfaces of a conferencing software.

As such, the LBGRI can be an image where the target foreground segment, if any, is replaced by pixel values having a particular value (e.g., 0 corresponding to the color black, 1 corresponding to the color white, or a value in between corresponding to a different color). FIG. 6C illustrates an example of a segmentation 656 of an LBGRI. The LBGRI of FIG. 6C is obtained from the output image displayed in the main stage 604 of FIG. 6A. The segmentation 656 includes a target background segment 660 and a mask 658 corresponding to the target foreground segment.

The output image generation tool 506 obtains a target output image that is to be displayed to the target participant. The output image generation tool 506 combines the LBGRI, which may be based on the segmentation obtained by the image segmentation tool 504, and the source foreground segment that is obtained from the image segmentation tool 504.

In an example, the output image generation tool 506 does not generate a target output image for a conference participant who meets predefined criteria. For example, if a conference participant is co-located with (e.g., is in the same physical conference room as) the target participant, then the output image generation tool 506 does not generate for the conference participant as it may be disorienting to the target participant to see the conference with two different backgrounds: one target background as described herein when the target participant looks at their target device; and a second background when the target participant looks at the conference participant across the room.

Figure 6B:
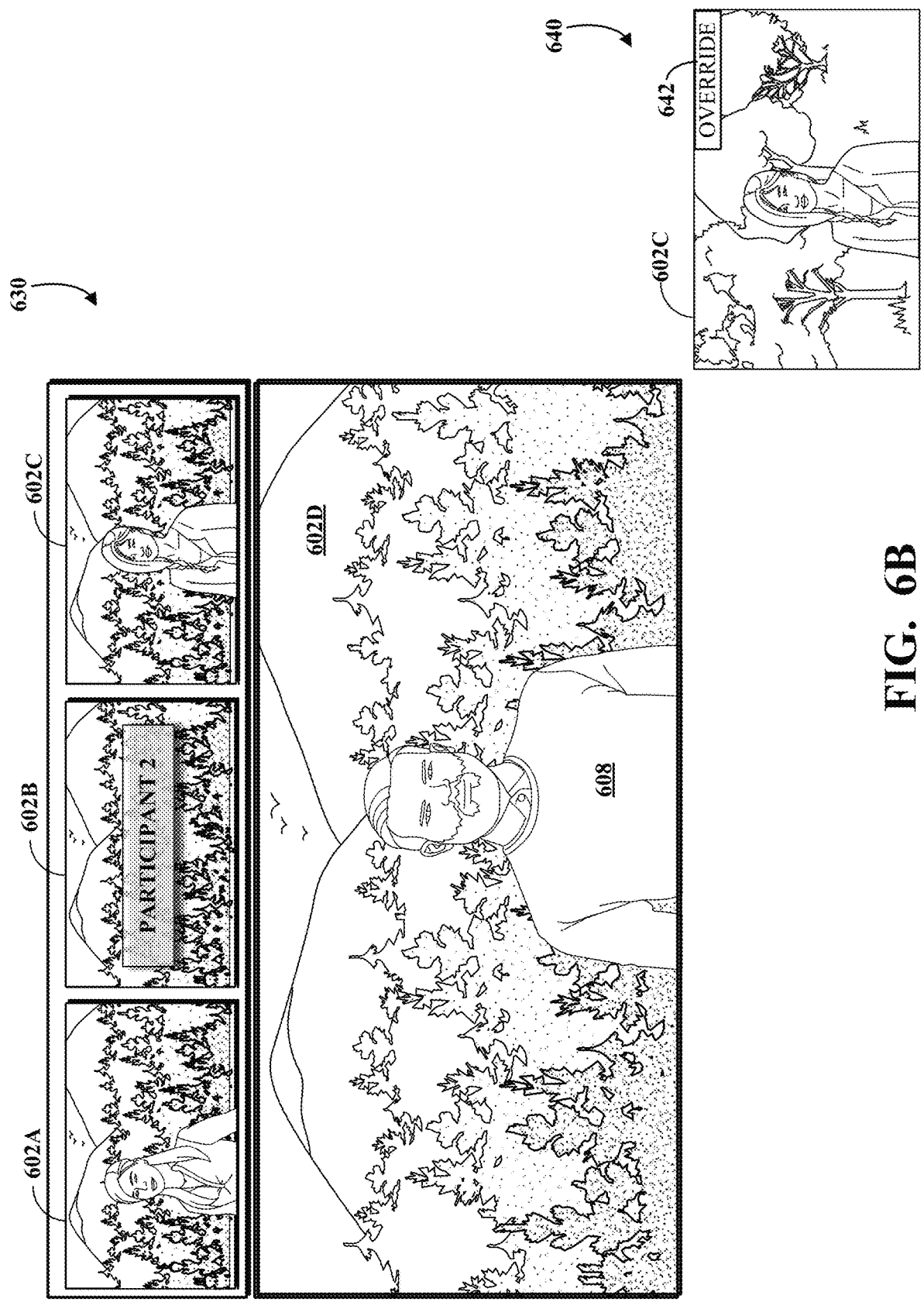
Figure 6C:
FIG. 6C illustrates an example of a segmentation of a local background replacement image.
Figure 6D:
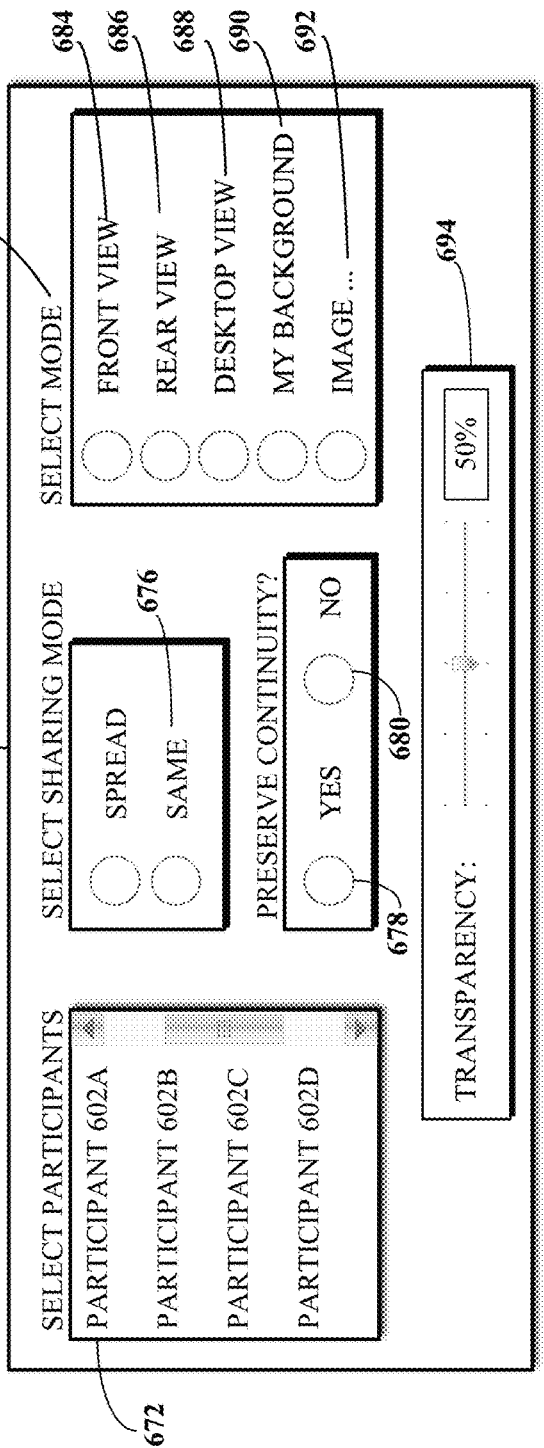
FIGS. 6D-6E illustrate additional examples of user interfaces of a conferencing software.

A UI 630 of FIG. 6B illustrates results of virtual background rendering based on target participant view. The UI 630 can be displayed on a display of the target participant based on, for example, the target participant 602D using the command 616. That is, the backgrounds of tiles of the conference participants 602A-602C are each set to the same background as that of the target participant 602D. To reiterate, the target output image that is displayed in a tile corresponding to a conference participant includes (e.g., is assembled using) a source foreground segment that includes the likeness of the conference participant and the LBGRI.

With respect to the participant 602B, as the participant 602B does not have their camera turned on, the background of the participant 602B tile is set to the same background as that of the target participant 602D with a foreground that is the identifier of the participant 602B. However, in another example, if no source output image is received for a conference participant (such as the participant 602B), then the background of the tile corresponding to that conference participant may not be set according to the target-background mode. In such a case, the tile for the participant 602B may continue to be shown as in the UI 600 of FIG. 6A.

In an example, a conference participant, whose background is overridden (e.g., replaced) at the target participant device, is notified of the override. For example, the target device 410 or the server 400 may transmit a notification of the override to the user device 412. The notification is indicative of an override of at least portions of output images transmitted from the user device 412 to the target device 410. The conference software 418 of the user device 412 can display a message regarding the override to the conference participant.

A UI 640 illustrates a portion of a display of the conference of FIG. 6A at the device of the participant 602C. The UI 640 includes a notification 642 indicating to the participant 602C that the background of the participant 602C is locally overridden by some target participant. In an example, the notification 642 can include the target conference participants who have overridden the background of the conference participant 602C. The participant 602C may be sharing (e.g., showing, presenting, or displaying) information that the participant 602C intends for the other participants to see. As such, it can be useful to the participant 602C to know that some other participants are not seeing the information. In an example, the notification may not be transmitted unless the conference participant has indicated a preference for receiving such notifications. In an example, the notification 642 may not be displayed unless the conference participant has indicated a preference for displaying such notifications.

The output image generation tool 506 combines the source foreground segment with the LBGRI (or more specifically, with the target background segment, such as the target background segment 660 of FIG. 6C) to obtain a target output image for display on a device of the target conference participant. The output image generation tool 506 may scale (e.g., resize) the source foreground segment so that the mask 658 is covered. Alternatively, the output image generation tool 506 may scale the LBGRI so that the mask 658 is covered by the source foreground segment.

The VBG extrapolation tool 508 may be used to complete the target background segment 660 so that it does not include the mask 658. That is, the VBG extrapolation tool 508 can replace the mask 658 with image data that is based on the target background segment 660. Any image inpainting technique, tool, or algorithm known in the art can be used. In an example, a machine learning (ML) model can be used to fill in the mask 658 based on the target background segment 660. In an example, the ML model can be a Generative Adversarial Network (GAN) that is trained to complete images that include missing patches. In an example, the GAN can be a Wasserstein GAN that creates coarse patches for filling missing regions in images. An obtained patched image can be further processed (such as by applying one or more deblocking filters, smoothing filters, or blending filters) to remove or smooth discontinuities between the added patches and the target background segment 660.

Returning again to FIG. 6A, the command 624 (labeled "SPREAD BG"), when executed, can cause the LBGRI to be used to set the tile backgrounds for at least some of the other conference participants. In response to the target conference participant invoking the command 624, the VBG spreading tool 510 may present or cause to be presented to the target conference participant a user interface, such as a UI 670 of FIG. 6D, that the target conference participant can use to configure to whom the LBGRI is to be spread, properties of the spreading, and the mode of the LBGRI.

The UI 670 includes a participants list 672 from which the target conference participant can select a subset of the other conference participants. The tile backgrounds of the subset of the other conference participants are to be set using the LBGRI. In an example, the participant list 672 can also include the target conference participant. The target participant can invoke the command 624 more than once to set different configurations of the tile backgrounds of different subsets of conference participants (or groups of conference participants).

By selecting a mode 674 (i.e., "SPREAD"), the target conference participant can indicate that the LBGRI is to be partitioned into sections corresponding to the number of selected conference participants of the participants list 672. The respective tile backgrounds of the selected conference participants are set using the portions. By selecting a mode 676 (i.e., "SAME"), the target conference participant can indicate that the respective tile backgrounds of each of the selected conference participants is to be set to the same LBGRI (as illustrated in FIG. 6B).

Figure 6E:
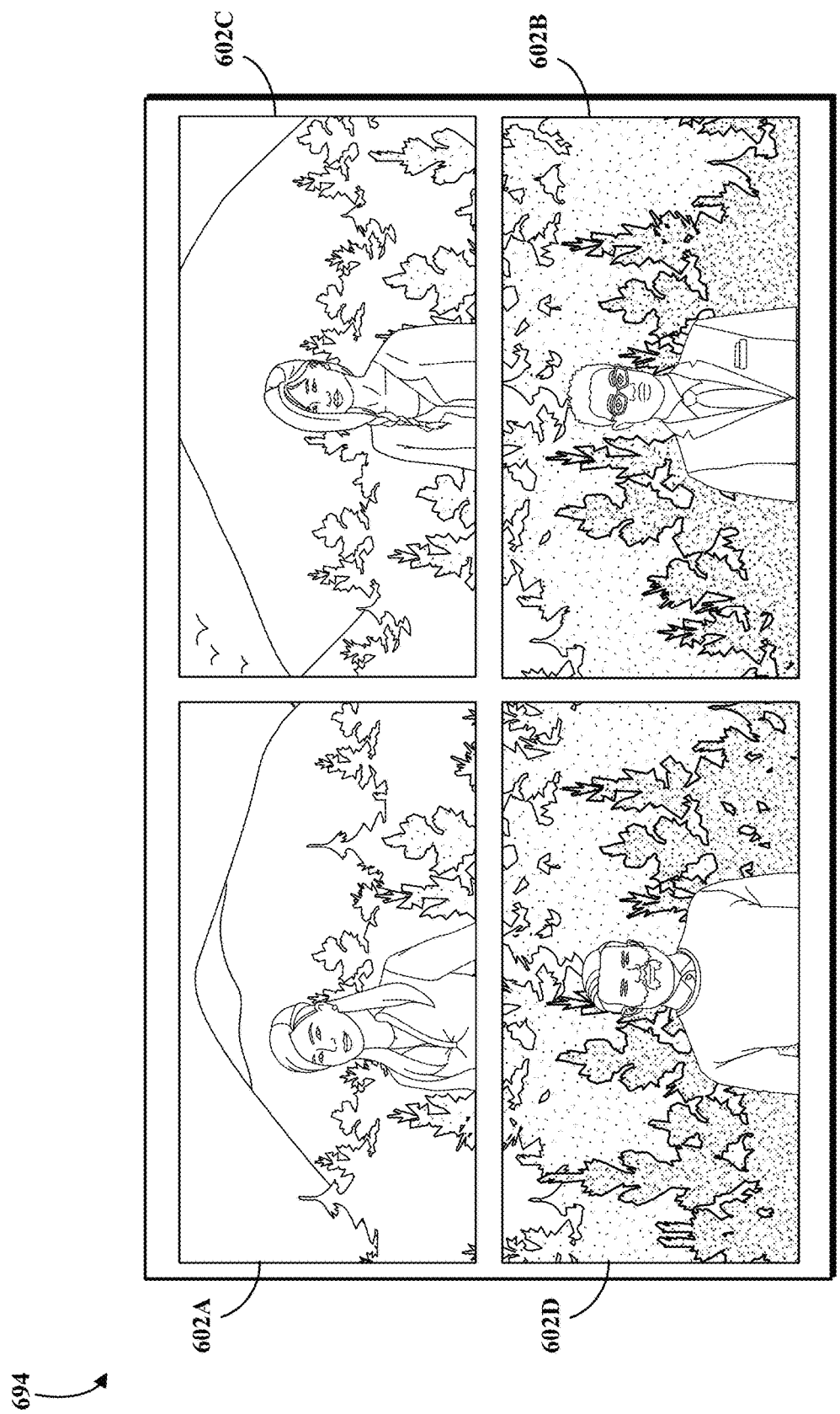

The LBGRI can be partitioned into portions corresponding to the number of selected conference participants and according to an arrangement. The VBG software 408 can select the arrangement so that each of the portions corresponds to an aspect ratio that minimally distorts (if at all) the portions. To illustrate, assume that the number of selected conference participants is 10, then the arrangement may be indicated as a 5×2 grid (i.e., a partitioning of the LBGRI into 2 columns and 5 rows), as a 2×5 grid (a partitioning of the LBGRI into 5 columns and 2 rows), as 4-3-3 grid (a partitioning of the LBGRI into 3 rows, where the first row includes 4 portions, the second row includes 3 portions, and the third row includes 3 portions). FIG. 6E illustrates an example 694, where the conference participants are arranged in a 2×2 grid. As such, the LBGRI is partitioned into 4 quadrants where each quadrant is used as a tile background for one of the conference participants.

In some examples, the conferencing software may allow the target participant to arrange the conference participants in an convenient arrangement. To illustrate, the target conference participant may initially select a 2-column arrangement that may be displayed on a right-side of a display; later on during the conference, the target conference participant may arrange the conference participants in a 1-row arrangement that may be displayed along a top edge of the display. Additionally, the target conference participant may arrange the conference participants in one order and later rearrange the conference participants in another order.

In some situations, it may be desirable to maintain the continuity of the portions regardless of the arrangement or order of the selected conference participants. As such, in the UI 670 of FIG. 6D, the target conference participant can select whether the continuity of the image portions should be preserved (by selecting an option 678) or not (by selecting an option 680). The UI 694 of FIG. 6E, described above, illustrates a 2×2 arrangement of the conference participants of FIG. 6A where the LBGRI is spread across the conference participants with the continuity preserved.

The UI 670 includes a mode selector 682 that the target participant can use to select (e.g., set) the target-background mode to use for the selected participants of the participant list 672. A front-view option 684, when selected, causes the VBG software 500 to operate as described with respect to the command 614. A rear-view option 686, when selected, causes the VBG software 500 to operate as described with respect to the command 616. A desktop-view option 688, when selected, causes the VBG software 500 to operate as described with respect to the command 622. An option 690, when selected, causes the VBG software 500 to operate as described with respect to the command 618. An option 692, when selected, causes the VBG software 500 to operate as described with respect to the command 620.

In an example, the target conference participant can also select a background transparency level using a control 694. The VBG software 500 uses the background transparency level to set the transparency of the LBGRI when obtaining target output images.

Returning again to FIG. 4, in an example, the VBG software 408 may transmit to the VBG software 416 of the target device 410 image masks that include only respective source foreground segments for the selected conference participants. For example, the VBG software 416 may transmit an indication to the VBG software 408 that virtual background rendering based on target participant view is to be used for the selected conference participants. The VBG spreading tool 510 of the target conference participant may combine the image mask with the appropriate image portion to obtain a target output image. In another alternative, the VBG spreading tool 510 of the VBG software 408 may combine the image mask with the appropriate image portion to obtain an output image that the VBG software 408 transmits to the VBG software 416 of a target conference participant.

Figure 7:
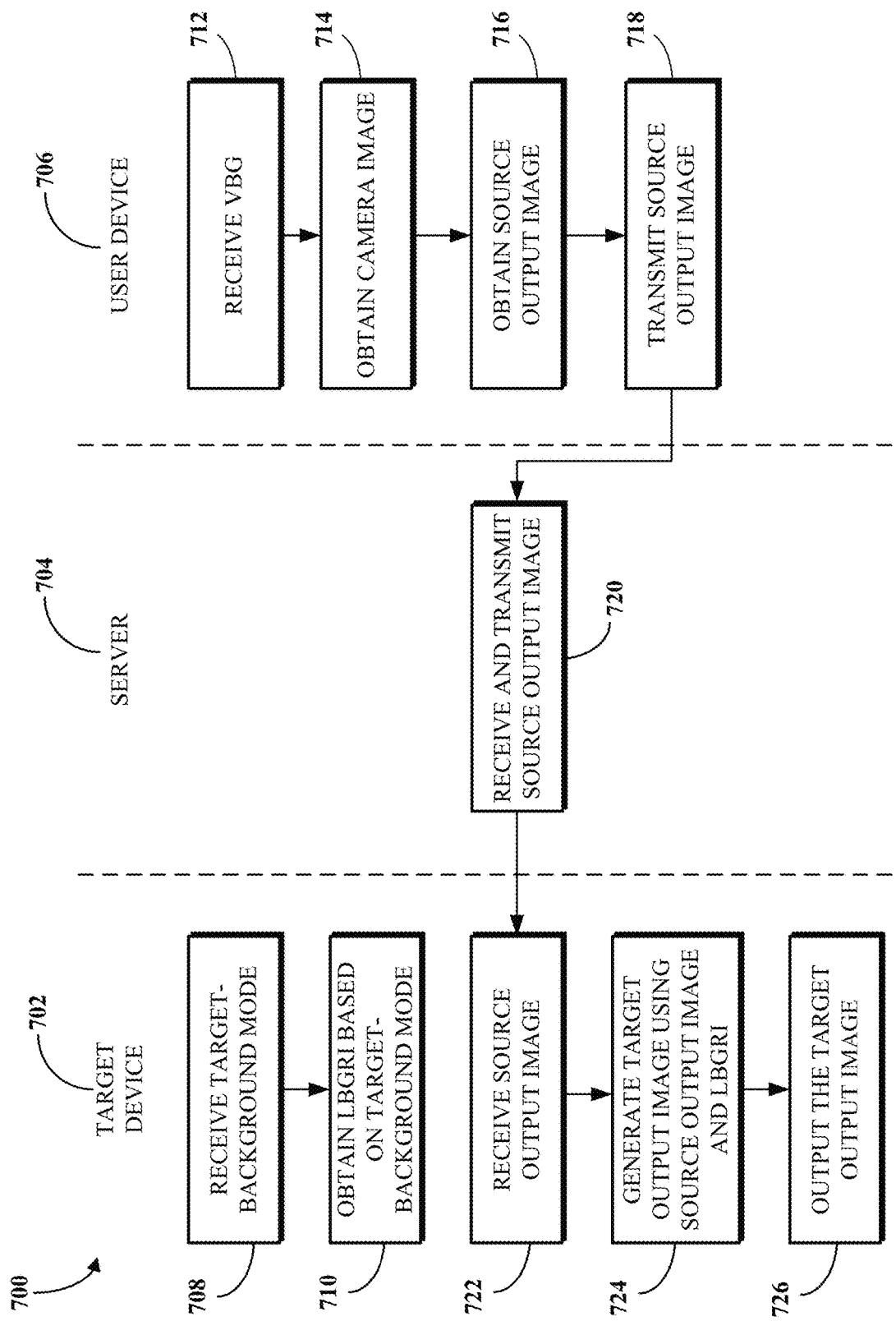
FIG. 7 is an example of an interaction diagram for virtual background rendering based on target participant view.

FIG. 7 is an example of an interaction diagram 700 for virtual background rendering based on target participant view. The interaction diagram 700 illustrates that two participants using respective participant devices, a target device 702 and a user device 706, are current participants of a conference hosted by a server 704, which includes a conferencing software platform, such as the software platform 402 of FIG. 4. The target device 702 can be the target device 410 of FIG. 4. The user device 706 can be the user device 412 of FIG. 4. The target device 702 and the user device 706 can each include a camera that can be used to obtain camera images for use by the conferencing software. The interaction diagram 700 describes an implementation of virtual background rendering based on target participant view where target output images are obtained (e.g., generated) at the target device 702.

At 708, a target-background mode is received. The target-background mode can be as described above. The target-background mode may be received in response to the target participant invoking a command, such as one of the commands 614-624 of FIG. 6A. At 710, an LBGRI is obtained based on the target-background mode. The LBGRI can be obtained as described above. While not specifically shown in the interaction diagram 700, a target background segment may be obtained from the LBGRI.

At 712, a VBG may be received at the user device 706. For example, the conference participant of the user device 706 may set a VBG that is replace the actual background in camera images captured using the camera of the user device 706. At 714, an image camera is obtained from the camera of the user device 706. At 716, the background of the camera image is replaced using the VBG to obtain a source output image. At 718, the source output image is transmitted to the server 704. In a case that not VBG is set for the conference participant of the user device 706, then step 716 may be omitted and the camera image itself can be source output image transmitted at 718.

At 720, the server 704 receives the source output image and transmits the source output image to the target device 702. The server 704 may receive source output images from multiple conference participants for transmission to the target device 702. In some implementations, the user device 706 may communicate directly with the target device 702. As such, the source output image can be transmitted to the target device 702 and the interaction diagram 700 would not include the step 720.

At 722, the source output image is received by the target device 702. At 724, a target output image is generated using the source output image and the LBGRI. More specifically, and as described above, a source foreground segment of the source output image is combined with a target background segment of the LBGRI to obtain the target output image. At 726, the target output image is output (e.g., displayed) on a display of the target device 702, such as in a tile corresponding to the conference participant associated with the user device 706.

Figure 8A:
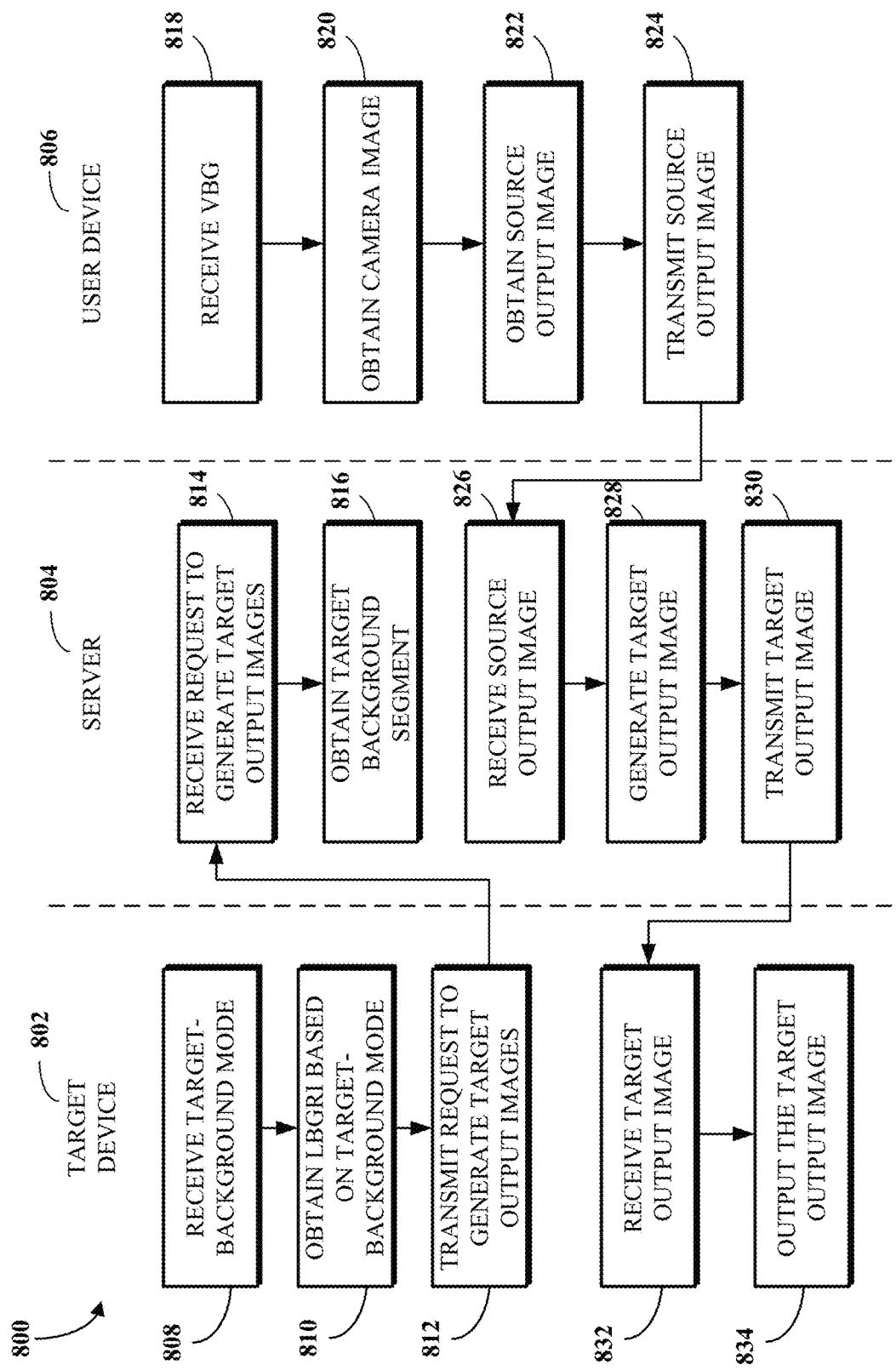
FIG. 8A is an example of another interaction diagram for virtual background rendering based on target participant view.

FIG. 8A is an example of another interaction diagram 800 for virtual background rendering based on target participant view. The interaction diagram 800 illustrates that two participants using respective participant devices, a target device 802 and a user device 806, are current participants of a conference hosted by a server 804, which includes a conferencing software platform, such as the software platform 402 of FIG. 4. The target device 702 can be the target device 410 of FIG. 4. The user device 806 can be the user device 412 of FIG. 4. The target device 702 and the user device 806 can each include a camera that can be used to obtain camera images for use by the conferencing software. Whereas target output images are generated at the target device 702 in the interaction diagram 700, in the interaction diagram 800 the output images are generated at the server 804.

At 808, a target-background mode is received. The target-background mode can be as described above and can be received as described with respect to 708 of FIG. 7. At 810, an LBGRI is obtained based on the target-background mode. The LBGRI can be obtained as described above, such as with respect to 710 of FIG. 7. At 812, a request to generate target output images is transmitted from the target device 802 to the server 804. For example, the request can be transmitted from a VBG software of the target device 802 to a VBG software of the server 804.

In an example, the request can include the LBGRI. In an example, the request can include a target background segment. That is, a segmentation of the LBGRI can be obtained at the target device 802 and the target background segment can be transmitted in the request to generate target output images. In another example, the segmentation can be performed at the server 804. In either case, at 816, the target background segment is obtained.

At 818, a VBG may be received at the user device 806. At 820, an image camera is obtained from the camera of the user device 806. At 822, the background of the camera image is replaced using the VBG to obtain a source output image. At 824, the source output image is transmitted to the server 804. At 826, the server 804 receives the source output image.

At 828, a target output image is generated. The source output image can be segmented to obtain at least a source foreground segment, as described above. The source foreground and the target background segment are combined to obtain the target output image. At 830, the target output image is transmitted to the target device 802. At 832, the target output image is received at the target device 802. At 834, the target output image is output (e.g., displayed) at the target device 802. For example, the target output image may be displayed in a tile corresponding to the conference participant associated with the user device 806.

Figure 8B:
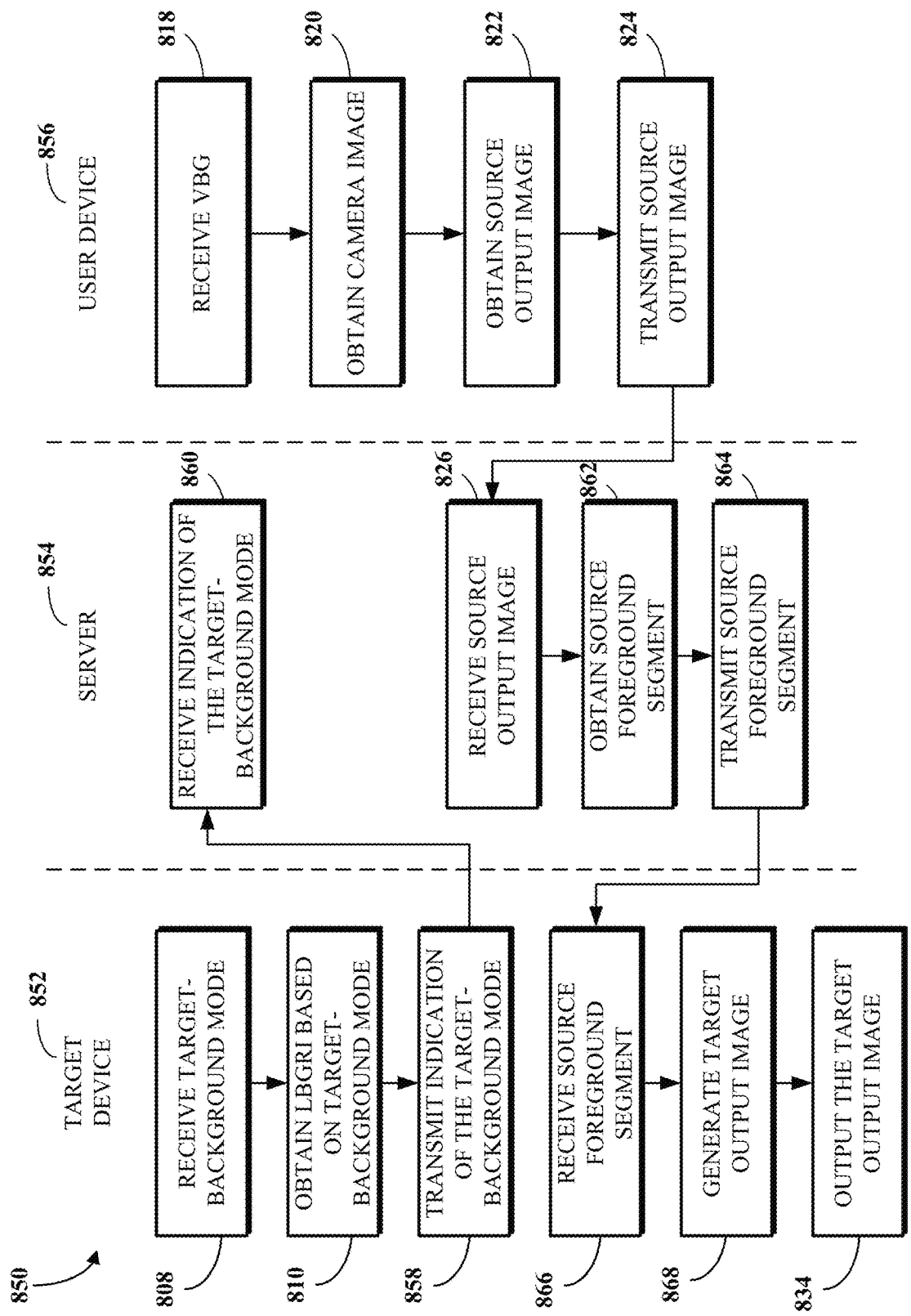
FIG. 8B is an example of another interaction diagram for virtual background rendering based on target participant view.

FIG. 8B is an example of another interaction diagram 850 for virtual background rendering based on target participant view. The interaction diagram 800 illustrates that two participants using respective participant devices, a target device 852 and a user device 856, are current participants of a conference hosted by a server 854. The interaction diagram 850 differs from the interaction diagram 800 in that the target output images are generated at the target device 752 using source foreground segments received from the server 854. In FIG. 8B, like components are denoted by like numerals as of FIG. 8A and are not further explained.

At 858, an indication of the target-background mode is transmitted from the target device 852 to the server 854. That is, an indication that virtual background rendering based on target participant view is to be performed at the target device 852 is transmitted to the server 854. At 860, the indication of the target-background mode is received at the server 654. At 862, after receiving a source output image at the server 854, a source foreground segment is obtained from the source output image. As described above, the source output image may be segmented to obtain the foreground segment. At 864, the source foreground segment is transmitted to the target device 852. At 866, the source foreground segment is received at the target device 852. At 868, a target output image is generated using the source foreground image and the LBGRI. As described above, generating the target output image using the source foreground image and the LBGRI may include obtaining a target background segment from the LBGRI and combining the target background segment with the source foreground segment to obtain the target output image.

Figure 9:
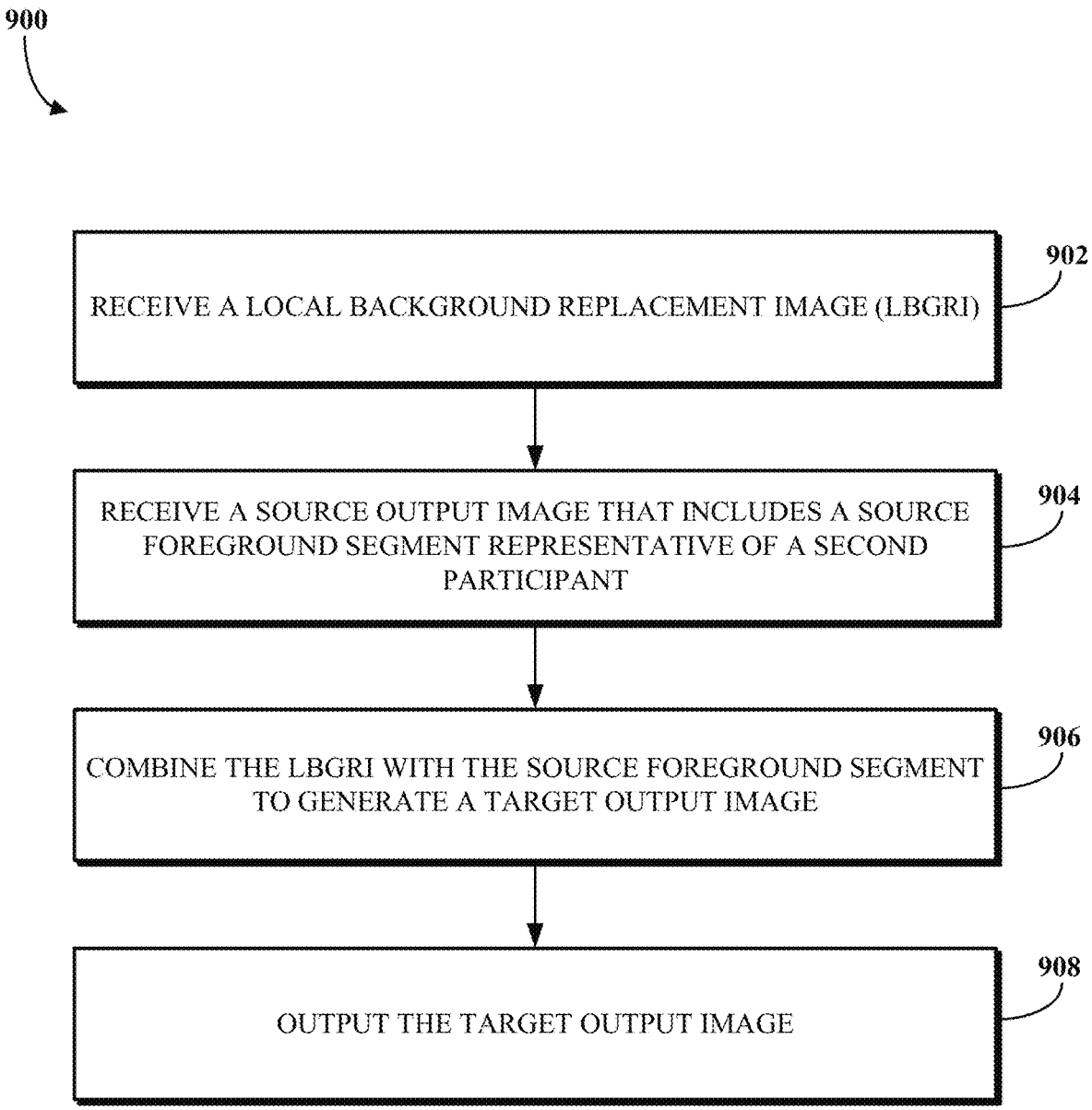
FIG. 9 is a flowchart of an example of a technique for setting a background for a conference participant for display at a target device of a target conference participant.

To further describe some implementations in greater detail, reference is next made to examples of techniques which may be performed for or using virtual background rendering based on target participant view. FIG. 9 is a flowchart of an example of a technique 900 for setting a background for a conference participant for display at a target device of a target conference participant. The technique 900 can be executed using computing devices, such as the systems, hardware, and software described with respect to FIGS. 1-8B.

The technique 900 can be performed, for example, by executing a machine-readable program or other computer-executable instructions, such as routines, instructions, programs, or other code. The steps, or operations, of the technique 900 or another technique, method, process, or algorithm described in connection with the implementations disclosed herein can be implemented directly in hardware, firmware, software executed by hardware, circuitry, or a combination thereof. The technique 900 can be implemented in whole or in part by a VBG software, such as the VBG software 500 of FIG. 5. The VBG software may be available or executing at a target user device or a server device.

For simplicity of explanation, the technique 900 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 902, a local background replacement image (LBGRI) is received. The LBGRI can be received at a device of a first (i.e., target) conference participant, such as the target device 410 of FIG. 4 or any other target device described herein. The device can be connected to an audio-visual conference that includes conference participants. The conference participants may include the first conference participant and a second participant.

The LBGRI can be received in any number of ways. As such, receiving the LBGRI can include receiving the LBGRI from the first conference participant, obtaining (e.g., selecting) the LBGRI based on a target-background mode, as described herein, or receiving the LBGRI in some other way. In an example, the LBGRI can be a virtual background image selected by the first conference participant. In an example, the LBGRI can be an image that is obtained from a camera directed at the first conference participant. Camera images, including the image, may be transmitted, or may be used to obtain output images to be transmitted, to at least some of the conference participants, such as in the case that that the first conference participant has enabled their camera during the conference. In an example, the LBGRI can be or include an image of an unobstructed front view of the first conference participant, as described herein.

At 904, a source output image is received from a device of the second participant. As described herein, the source output image includes a source foreground segment that is representative (e.g., is a likeness) of the second participant. At 906, the LBGRI is combined with the source foreground segment to generate a target output image. At 908, the target output image is output (e.g., displayed) at the first device. In an example, the target output image can be displayed in a tile corresponding to the second participant where respective tiles are output for at least some (e.g., all) of the conference participants.

In an example, the technique 900 can include outputting a source output image received from a device of a third conference participant responsive to determining that the third conference participant and the first conference participant are located at a same physical location. That is, the technique 900 omits obtaining a target output image, as described herein, for the third conference participant responsive to determining that the third conference participant and the first conference participant are located at a same physical location.

In an example, the technique 900 can include receiving a second LBGRI that is different from the first LBGRI. The second LBGRI can be combined with a source foreground segment of a third conference participant to generate a second target output image. The technique 900 outputs the first target output image for the second participant and outputs the second target output image for the third conference participant. In an example, combining the LBGRI with the source foreground segment to generate the target output image can include partitioning the LBGRI into image portions; and combining an image portion of the image portions with the source foreground segment to generate the target output image.

In an example, a first LBGRI can be associated with a first subset of the conference participants, and a second LBGRI can be associated with a second subset of the conference participants. That is, the first LBGRI can be used to obtain target output images for the conference participants of the first subset; and the second LBGRI can be used to obtain target output images for the conference participants of the second subset.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method.

The method may include receiving, at a first device of a first conference participant, a local background replacement image (LBGRI), where the first device is connected to an audio-visual conference that includes conference participants, and where the conference participants include the first conference participant and a second participant. The method also includes receiving, from a second device of the second participant, a source output image that includes a source foreground segment representative of the second participant. The method also includes combining the LBGRI with the source foreground segment to generate a target output image. The method also includes outputting the target output image at the first device. Other embodiments of this aspect include corresponding computer systems, apparatus, and computer programs recorded on one or more computer storage devices, each configured to perform the actions of the methods.

Implementations may include one or more of the following features. The method where the LBGRI may include a virtual background image selected by the first conference participant. The LBGRI may include an image obtained from a camera directed at the first conference participant for obtaining camera images to be transmitted to at least some of the conference participants. The LBGRI may include an image of an unobstructed front view of the first conference participant.

The method may include receiving, from the first conference participant, a target-background mode indicating whether a rear view, a front view, or another view of the first conference participant is the LBGRI.

The method may include transmitting a notification to the second device indicative of an override of at least a portion of the source output image at the first device. Outputting the target output image at the first device may include outputting the target output image in a tile corresponding to the second participant, where respective tiles of at least some of the conference participants are output at the first device.

The method may also include receiving, from the first conference participant, a target-background mode; and obtain the LBGRI based on the target-background mode. Combining the LBGRI with the source foreground segment to generate the target output image may include setting a background transparency level for the LBGRI prior to generating the target output image. Outputting the target output image may include outputting the target output image in a tile corresponding to the second participant. Combining the LBGRI with the source foreground segment to generate the target output image may include partitioning the LBGRI into image portions and combining an image portion of the image portions with the source foreground segment to generate the target output image.

The LBGRI may be a first LBGRI and the target output image may be a first target output image. The method may include receiving a second LBGRI that is different from the first LBGRI. The second LBGRI may be combined with a source foreground segment of a third conference participant to generate a second target output image. The method may include outputting the first target output image for the second participant and the second target output image for the third conference participant.

The method may include associating a first LBGRI with a first subset of the conference participants and associating a second LBGRI with a second subset of the conference participants. The method may include outputting respective tiles for at least some of the conference participants, where the respective tiles may include respective target output images that are obtained by combining at least portions of the LBGRI with respective foreground segments of the at least some of the conference participants. Implementations of the described techniques may include hardware, a method or process, or computer software on a computer-accessible medium.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. The quality of memory or media being non-transitory refers to such memory or media storing data for some period of time or otherwise based on device power or a device power cycle. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A method, comprising:
    receiving, by a receiving device of a first conference participant, a local background replacement image (LBGRI), wherein the receiving device is connected to an audio-visual conference that includes conference participants, and wherein the conference participants include the first conference participant and a second participant;
    receiving, by the receiving device from a sending device of the second participant, a source output image that includes a source foreground segment representative of the second participant and a source background segment;
    combining, by the receiving device, the LBGRI with the source foreground segment to generate a target output image; and
    outputting the target output image at the receiving device.

2. The method of claim 1, wherein the LBGRI comprises a virtual background image selected by the first conference participant.

3. The method of claim 1, wherein the LBGRI comprises an image obtained from a camera directed at the first conference participant for obtaining camera images to be transmitted to at least some of the conference participants.

4. The method of claim 1, wherein the LBGRI comprises an image of an unobstructed front view of the first conference participant.

5. The method of claim 1, further comprising:
    receiving, from the first conference participant, a target-background mode indicating whether a rear view, a front view, or another view of the first conference participant is the LBGRI.

6. The method of claim 1, further comprising:
    transmitting a notification to the sending device indicative of an override of at least a portion of the source output image at the receiving device.

7. The method of claim 1, wherein outputting the target output image at the receiving device comprises:
    outputting the target output image in a tile corresponding to the second participant, wherein respective tiles of at least some of the conference participants are output at the receiving device.

8. A device, comprising:
    a memory; and
    a processor, the processor configured to execute instructions stored in the memory to:
        receive a local background replacement image (LBGRI), wherein the device is connected to an audio-visual conference that includes conference participants, and wherein the conference participants include a first conference participant and a second participant;
        receive, from a sending device of the second participant, a source output image that includes a source foreground segment representative of the second participant and a source background segment;
        combine the LBGRI with the source foreground segment to generate a target output image; and
        output the target output image at the device.

9. The device of claim 8, wherein the LBGRI comprises a virtual background image selected by the first conference participant.

10. The device of claim 8, wherein the LBGRI comprises an image obtained from a camera directed at the first conference participant.

11. The device of claim 8, wherein the LBGRI comprises an image of an unobstructed front view of the first conference participant.

12. The device of claim 8, wherein the processor is further configured to execute instructions to:
    receive, from the first conference participant, a target-background mode; and
    obtain the LBGRI based on the target-background mode.

13. The device of claim 8 wherein the instructions to combine the LBGRI with the source foreground segment to generate the target output image comprise instructions to:
    set a background transparency level for the LBGRI prior to generating the target output image.

14. The device of claim 8, wherein the instructions to output the target output image comprise instructions to:
    output the target output image in a tile corresponding to the second participant.

15. A non-transitory computer readable medium storing instructions operable to cause one or more processors to perform operations comprising:
    receiving, at a receiving device of a first conference participant, a local background replacement image (LBGRI), wherein the receiving device is connected to an audio-visual conference that includes conference participants, and wherein the conference participants include the first conference participant and a second participant;
    receiving, by the receiving device from a sending device of the second participant, a source output image that includes a source foreground segment representative of the second participant and a source background segment;
    combining, by the receiving device, the LBGRI with the source foreground segment to generate a target output image; and
    outputting the target output image at the receiving device.

16. The non-transitory computer readable medium of claim 15, wherein the LBGRI is a first LBGRI and the target output image is a first target output image, and wherein the operations further comprise:

receiving a second LBGRI that is different from the first LBGRI;

combining the second LBGRI with a source foreground segment of a third conference participant to generate a second target output image; and output the first target output image for the second participant and the second target output image for the third conference participant.

17. The non-transitory computer readable medium of claim 15, wherein the operations further comprise:

associating a first LBGRI with a first subset of the conference participants; and associating a second LBGRI with a second subset of the conference participants.

18. The non-transitory computer readable medium of claim 15, wherein combining the LBGRI with the source foreground segment to generate the target output image comprises:

partitioning the LBGRI into image portions; and combining an image portion of the image portions with the source foreground segment to generate the target output image.

19. The non-transitory computer readable medium of claim 15, wherein the operations further comprise:

outputting respective tiles for at least some of the conference participants, wherein the respective tiles comprise respective target output images that are obtained by combining at least portions of the LBGRI with respective foreground segments of the at least some of the conference participants.

20. The non-transitory computer readable medium of claim 15, wherein the LBGRI is based at least in part on a virtual background selected by the first conference participant.

* * * * *